(12) United States Patent
Mukai et al.

(10) Patent No.: US 10,110,807 B2
(45) Date of Patent: Oct. 23, 2018

(54) IMAGING DEVICE WHICH OBTAINS STILL IMAGES FROM CAPTURED VIDEO

(71) Applicant: Panasonic Intellectual Property Management Co., Ltd., Osaka (JP)

(72) Inventors: Tsutomu Mukai, Osaka (JP); Yoshinori Okazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/229,112

(22) Filed: Aug. 5, 2016

(65) Prior Publication Data

US 2016/0344933 A1    Nov. 24, 2016

Related U.S. Application Data

(63) Continuation of application No. PCT/JP2015/003745, filed on Jul. 27, 2015.

(30) Foreign Application Priority Data

Jul. 29, 2014  (JP) .................................. 2014-154197

(51) Int. Cl.
*H04N 5/232* (2006.01)
*H04N 5/77* (2006.01)
(Continued)

(52) U.S. Cl.
CPC ....... *H04N 5/23229* (2013.01); *G03B 7/0805* (2013.01); *H04N 1/212* (2013.01);
(Continued)

(58) Field of Classification Search
CPC ............................ H04N 1/212; H04N 5/2353
See application file for complete search history.

(56) References Cited

U.S. PATENT DOCUMENTS 6,243,531 B1    6/2001    Takeuchi et al.
8,749,687 B2 *  6/2014    Kang ..................... H04N 5/232
                                                            348/333.01
(Continued)

FOREIGN PATENT DOCUMENTS

CN    1226063 A    8/1999
CN    103139428 A    6/2013
(Continued)

OTHER PUBLICATIONS

Co-pending U.S. Appl. No. 15/366,408, filed Dec. 1, 2016.
(Continued)

*Primary Examiner* — Gary C Vieaux
(74) *Attorney, Agent, or Firm* — Renner Otto Boisselle & Sklar, LLP

(57) ABSTRACT

The imaging device includes: an optical system unit that controls optical information indicating an object image; an imaging unit that generates image data from the optical information input through the optical system unit; an image processor that performs a predetermined process to the image data generated by the imaging unit; and a controller that controls at least one of the optical system unit, the imaging unit, and the image processor based on a set value relating to video capturing so as to generate video data. The controller sets a set value relating to the video capturing in each of a first video mode and a second video mode (photo/video mode), and automatically sets the set value relating to the video capturing in the second video mode to a set value more suitable for recording a still image than in the first video mode.

16 Claims, 27 Drawing Sheets

(51) Int. Cl.
*H04N 9/804* (2006.01)
*H04N 1/21* (2006.01)
*H04N 5/235* (2006.01)
*H04N 5/372* (2011.01)
*G03B 7/0805* (2014.01)

(52) U.S. Cl.
CPC ........... *H04N 1/215* (2013.01); *H04N 5/2353* (2013.01); *H04N 5/2356* (2013.01); *H04N 5/23216* (2013.01); *H04N 5/23245* (2013.01); *H04N 5/23293* (2013.01); *H04N 5/372* (2013.01); *H04N 5/772* (2013.01); *H04N 9/8042* (2013.01)

(56) References Cited

U.S. PATENT DOCUMENTS

| | | | |
|---|---|---|---|
| 8,897,617 B2* | 11/2014 | Park | H04N 5/45 386/241 |
| 2002/0003576 A1* | 1/2002 | Konishi | H04N 1/212 348/231.99 |
| 2003/0031469 A1* | 2/2003 | Hirai | H04N 9/7921 386/224 |
| 2003/0095191 A1 | 5/2003 | Saito | |
| 2003/0118329 A1* | 6/2003 | Obrador | G06F 17/30852 386/333 |
| 2003/0189647 A1* | 10/2003 | Kang | H04N 5/232 348/207.99 |
| 2005/0041949 A1 | 2/2005 | Onuki et al. | |
| 2009/0096902 A1* | 4/2009 | Kobayashi | H04N 5/23245 348/296 |
| 2009/0158315 A1* | 6/2009 | Bendall | H04N 7/185 725/32 |
| 2010/0231735 A1* | 9/2010 | Burian | H04N 1/2112 348/220.1 |
| 2010/0265344 A1* | 10/2010 | Velarde | H04N 5/232 348/208.16 |
| 2010/0295966 A1* | 11/2010 | Furlan | H04N 5/232 348/231.2 |
| 2011/0279709 A1* | 11/2011 | Nonaka | H04N 5/232 348/231.6 |
| 2012/0212663 A1* | 8/2012 | Takita | H04N 5/238 348/364 |
| 2012/0281115 A1* | 11/2012 | Kouncar | H04N 21/44025 348/231.99 |
| 2013/0107070 A1* | 5/2013 | Hsu | G07C 5/0866 348/220.1 |
| 2013/0141743 A1 | 6/2013 | Miyazawa et al. | |
| 2015/0015774 A1* | 1/2015 | Sugie | H04N 5/2353 348/364 |
| 2015/0078734 A1* | 3/2015 | Yoo | G11B 27/005 386/349 |
| 2015/0116568 A1* | 4/2015 | Marvit | H04N 5/23245 348/333.01 |

FOREIGN PATENT DOCUMENTS

| | | |
|---|---|---|
| CN | 103462627 | 12/2013 |
| EP | 946044 A2 | 9/1999 |
| JP | 9-154104 | 6/1997 |
| JP | 11-164245 | 6/1999 |
| JP | 2003-069863 | 3/2003 |
| JP | 2005-062733 | 3/2005 |
| JP | 2006094253 A * | 4/2006 |
| JP | 2008-252685 | 10/2008 |
| JP | 2009-065486 | 3/2009 |
| JP | 2009-147853 | 7/2009 |
| JP | 2012-169856 | 9/2012 |
| WO | 2008/032721 A1 | 3/2008 |

OTHER PUBLICATIONS

Co-pending U.S. Appl. No. 15/366,430, filed Dec. 1, 2016.
Co-pending U.S. Appl. No. 15/366,541, filed Dec. 1, 2016.
Co-pending U.S. Appl. No. 15/366,557, filed Dec. 1, 2016.
International Search Report of PCT application No. PCT/JP2015/003745 dated Sep. 29, 2015.
English Translation of Chinese Search Report dated Feb. 6, 2017 for the related Chinese Patent Application No. 201580010182.3.
The Extended European Search Report dated Feb. 14, 2017 for the related European Patent Application No. 15826937.3.
Communication pursuant to Article 94(3) dated Oct. 16, 2017 for the related European Patent Application No. 15826937.3.
Anonymous: "Panasonic Lumix DMC-FZ1000 Review: Digital Photography Review", Jul. 21, 2014 (Jul. 21, 2014), XP055414156, Retrieved from the Internet: URL:https://www.dpreview.com/reviews/panasonic-lumix-dmc-fz1000/7 [retrieved on Oct. 10, 2017].

\* cited by examiner

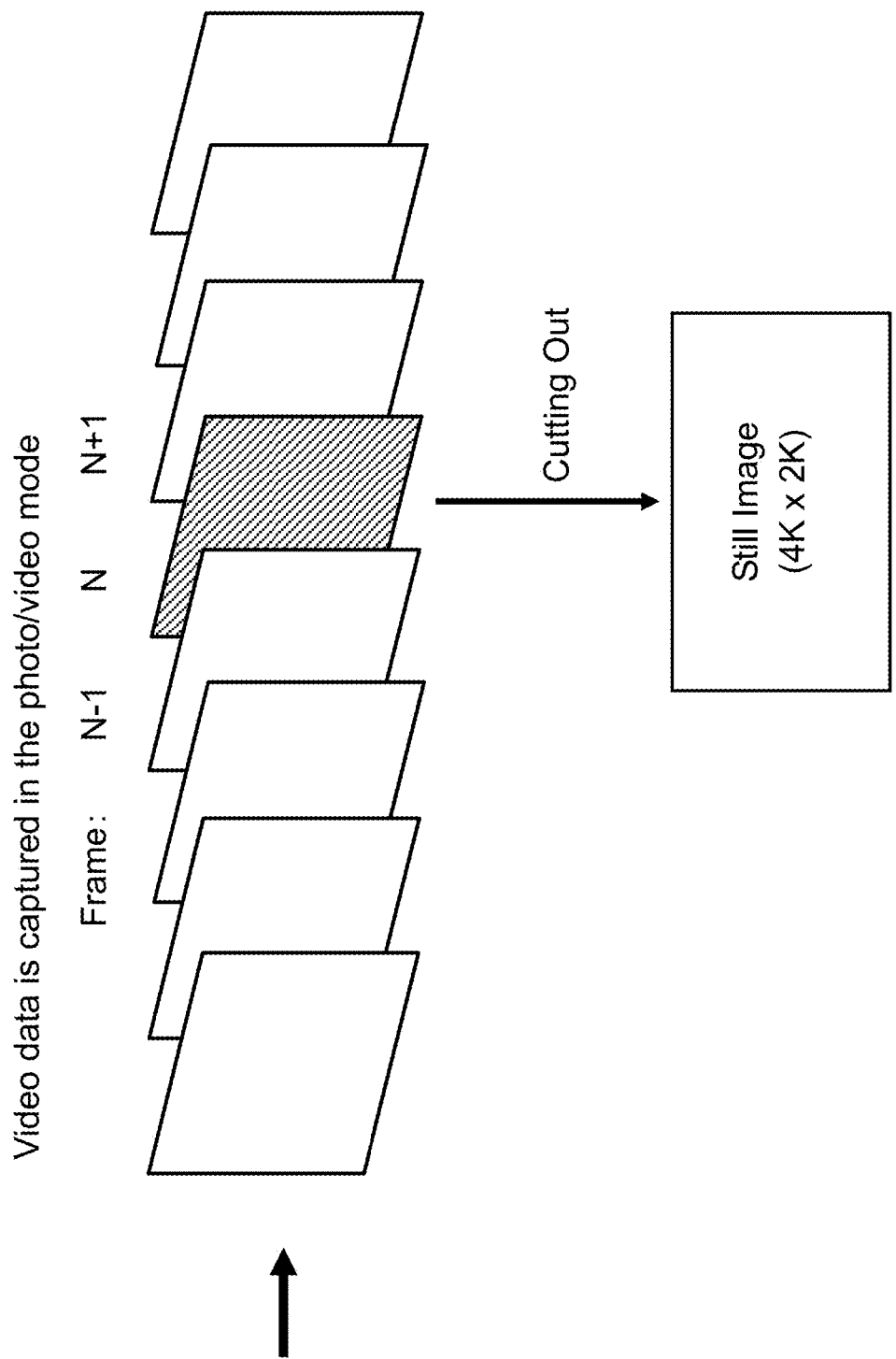

FIG. 4

| | Normal Video Mode | Photo/Video Mode |
|---|---|---|
| Image Quality (Resolution) | VGA~4K | 4K |
| Frame Rate | 24p/25p/30p | 30p |
| Color Tone Setting | Normal | Setting for still image |
| Exposure Setting | Select from the modes (P/A/S/M) | S-mode (shutter speed priority mode: the shutter speed is less than the frame period) |
| Brightness Level | 16-235<br>16-255<br>0-255 | 0-255<br>(same as photo) |
| Aspect Ratio of Image | 16:9 | 16:9/4:3/3:2/1:1 |
| Upper-limit value of automatic ISO | Normal | Value higher than normal video mode |
| AF Tracking Speed | Normal | Speed higher than normal video mode |
| WB Tracking Speed | Normal | Speed higher than normal video mode |
| AE Tracking Speed | Normal | Speed higher than normal video mode |

FIG. 5A
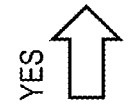

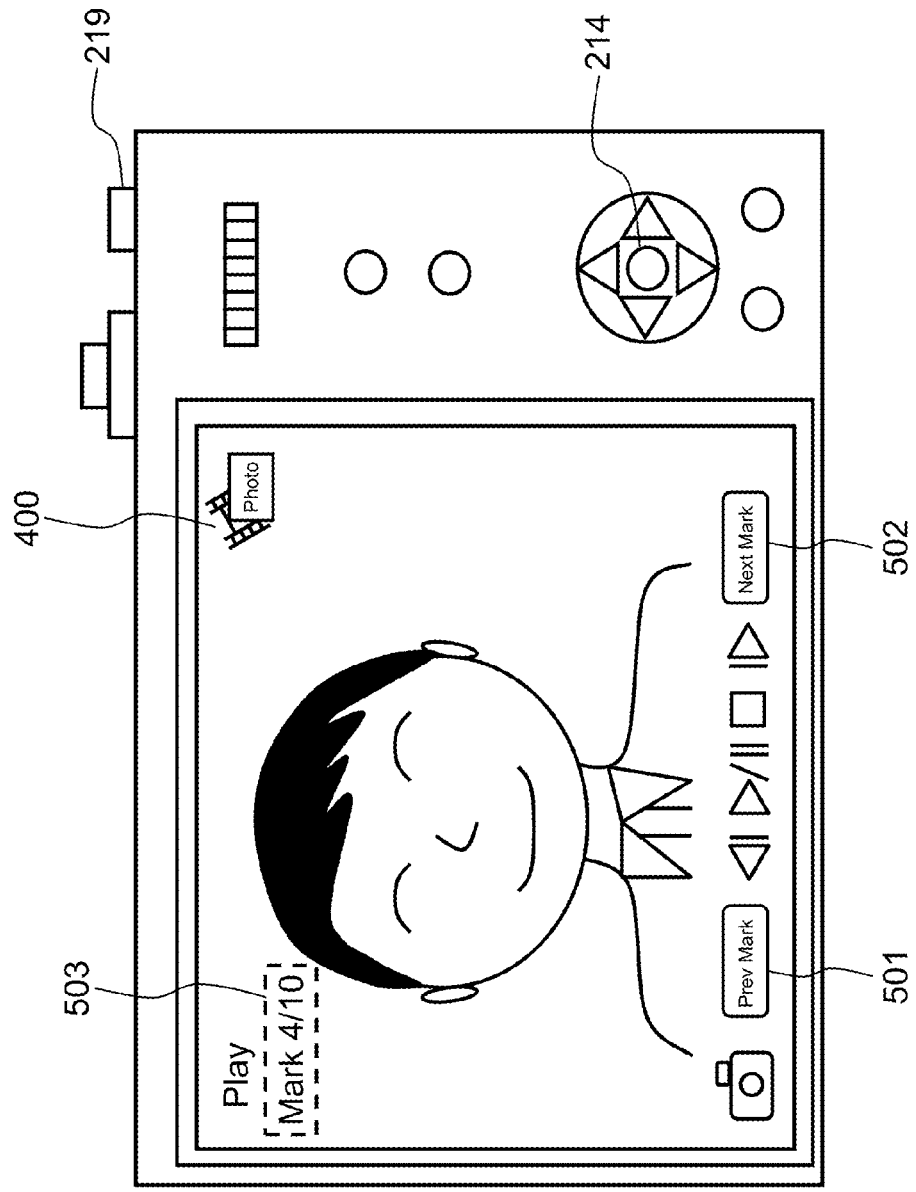

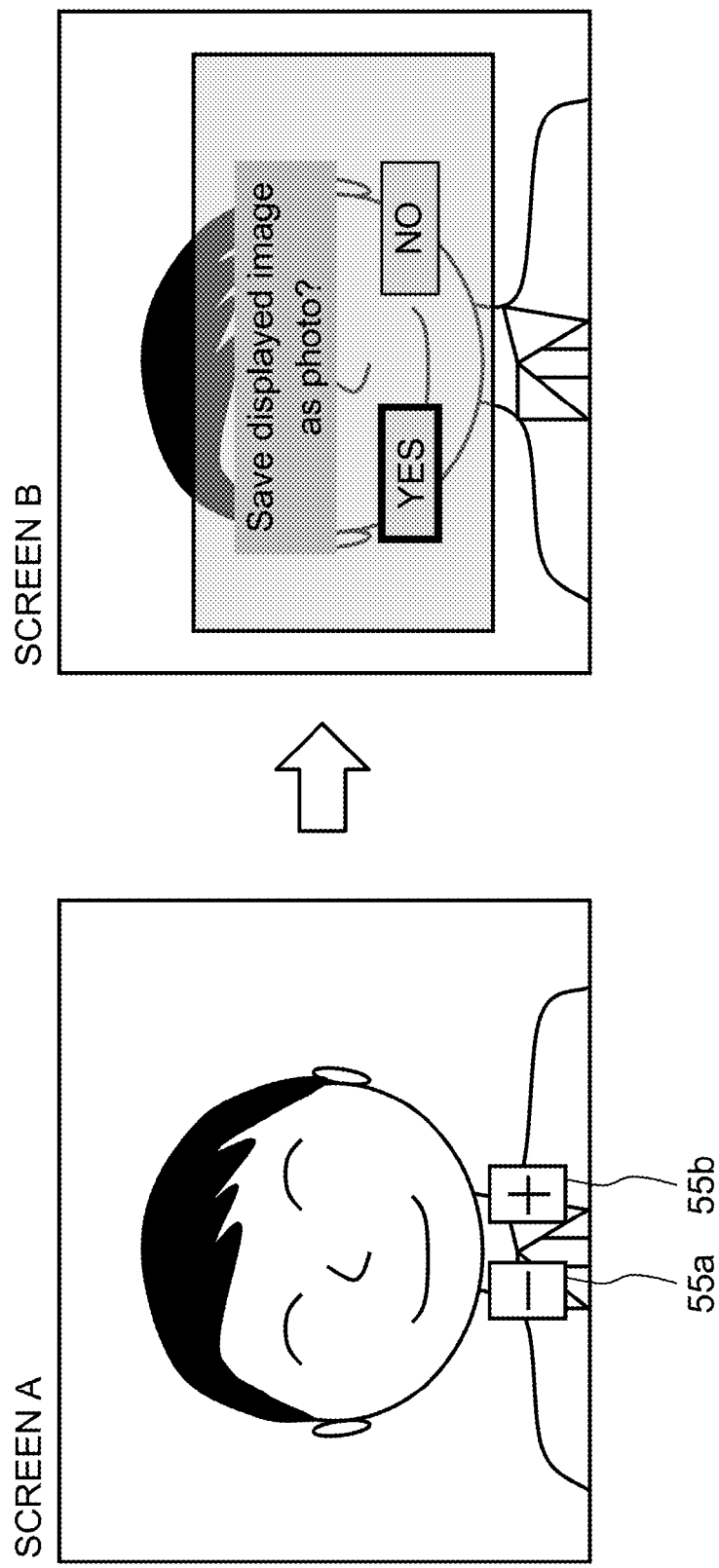

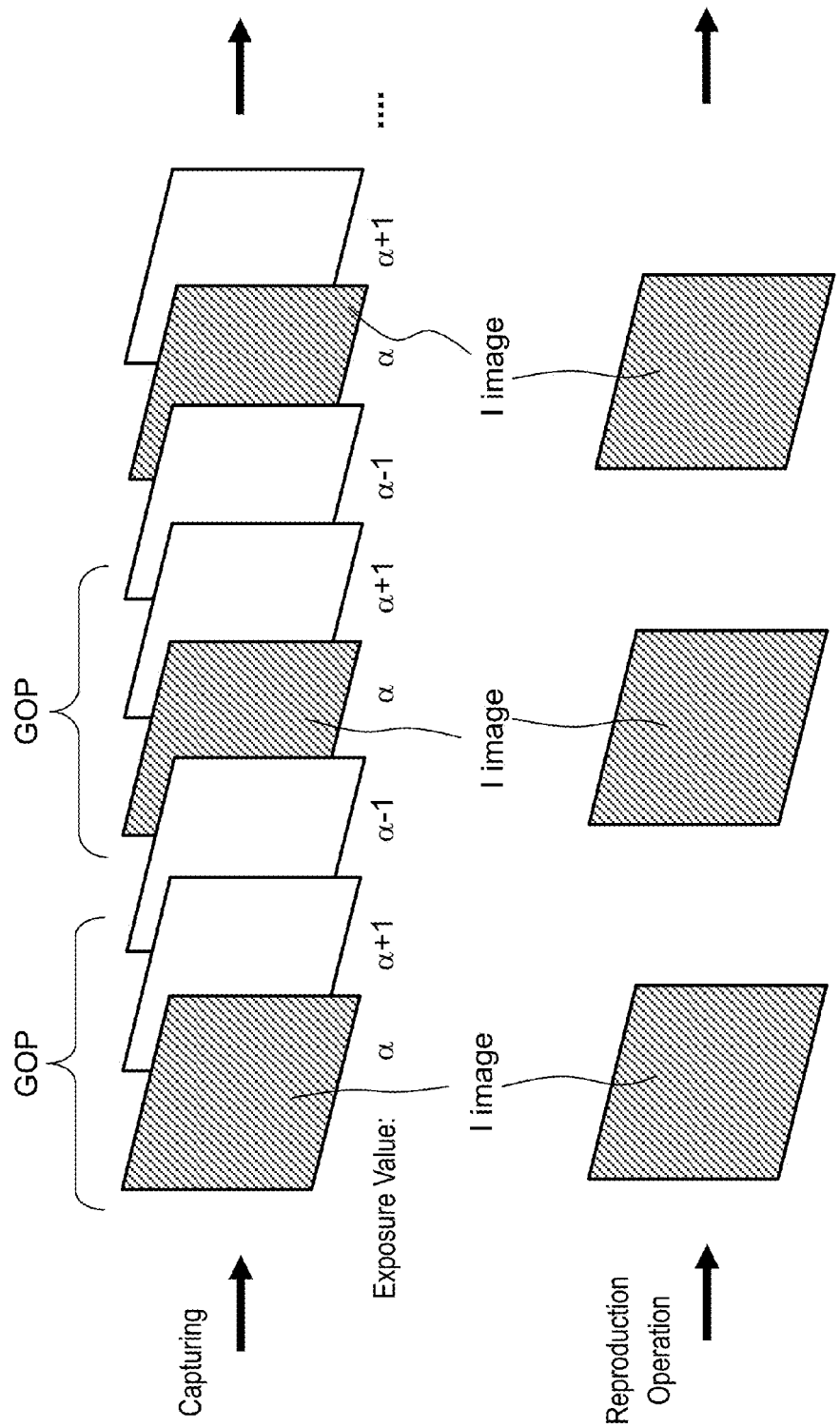

| Time (msec) | Rotation Information (deg) | Zoom Information | Aperture | Exposure Bias | Shutter Speed |
|---|---|---|---|---|---|
| 0 | 0 | 20mm | F2.8 | ±0 | 1/1000 |
| 1000 | 90 | 35mm | F4.0 | +1/3 | 1/1000 |
| 2300 | 270 | 60mm | F4.5 | +2/3 | 1/1000 |
| 5000 | 180 | 30mm | F3.2 | -1/3 | 1/1000 |

IMAGING DEVICE WHICH OBTAINS STILL IMAGES FROM CAPTURED VIDEO

BACKGROUND

1. Field

The present disclosure relates to an imaging device that generates an image of an object.

2. Description of Related Art

In general, to capture a still image, a user holds an imaging device while being conscious of a photo opportunity, and when a desired photo opportunity has come, the user presses a release button, thereby capturing an image at the desired moment. However, a conventional imaging device captures an image at the moment at which release button is pressed. Therefore, it is difficult to take a picture of happenings/incidents that can occur any time or take a picture of an instantaneous state of an object (liquid, flame, etc.) which changes its state with time.

For example, PTL 1 discloses an imaging device that can capture a still image while capturing a video. According to this imaging device, still image data is temporarily stored on an internal memory according to an instruction to capture a still image while a video is recorded, video data is recorded on a recording medium, and then, the still image data on the internal memory is read out and recorded on the recording medium. With this process, the imaging device enables capturing of a still image during capturing of a video.

CITATION LIST

Patent Literature

PTL 1: Unexamined Japanese Patent Publication No. H09-154104

SUMMARY

With the imaging device disclosed in PTL 1, a user has to perform an operation for an instruction to capture a still image while recording a video, when a desired photo opportunity has come. That is, the user has to be conscious of a timing to capture a still image, i.e., a photo opportunity, and thus, it is difficult to capture an image of unexpected happenings, incidents, or the like.

Further, in the imaging device disclosed in PTL 1, image data of one frame in video data is recorded as a still image. Therefore, the quality of the still image is affected by image quality of each frame image constituting a video. Here, a video is captured under capturing conditions (set values relating to video capturing) by which high image quality or quality level as a video is obtained. For example, a shutter speed is set to a value same as that for a length of one frame period during capturing of a video, in order to implement smooth moving-image reproduction. Specifically, if the frame rate in capturing a video is 30 fps (frame per second), a shutter speed is set to be 1/30 second. However, a still image cut out from the video data captured with the shutter speed described above may include a blurred object, especially when the object is moving. Therefore, when a still image is generated from a video, a still image with high image quality cannot be obtained by the conventional imaging device.

The present disclosure provides an imaging device that enables a user to generate a still image that is captured without missing an unexpected photo opportunity.

The imaging device according to the present disclosure includes: an optical system unit that controls optical information indicating an object image; an imaging unit that generates image data from the optical information input through the optical system unit; an image processor that performs a predetermined process to the image data generated by the imaging unit; and a controller that controls at least one of the optical system unit, the imaging unit, and the image processor based on a set value relating to video capturing so as to generate video data. The controller sets a set value relating to the video capturing in each of a first video mode and a second video mode, and automatically sets the set value relating to the video capturing in the second video mode to a set value more suitable for recording a still image than in the first video mode. The recording in the second video mode is performed from start to end of a video recording.

The imaging device according to the present disclosure includes, in addition to the first video mode for recording a video, the second video mode for recording a video with a capturing setting more suitable for recording a still image than in the first video mode. A user can extract a desired still image from video data generated in the second video mode. Therefore, the user can generate an image captured at the decisive moment, which has been difficult in the related art, without being conscious of a photo opportunity.

BRIEF DESCRIPTION OF DRAWINGS

FIG. 3 is a diagram describing a cutout of a still image from video data.

FIG. 4 is a diagram for describing various set values in a normal video mode and a photo/video mode.

FIG. 5A is a diagram illustrating a screen for setting the photo/video mode.

FIG. 10 is a diagram illustrating operation buttons for a transfer between marked frames.

FIG. 11 is a diagram for describing an operation for cutting out a still image from video data.

FIG. 20 is a diagram for describing bracket capturing in the photo/video mode.

FIG. 25 is a diagram for describing rotation information recorded in a header of a video.

DETAILED DESCRIPTION

Exemplary embodiments will be described below in detail with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant, and to facilitate understanding of a person skilled in the art. Note that the accompanying drawings and the following description are provided by the inventors in order for the person skilled in the art to sufficiently understand the present disclosure, and are not intended to limit the subject matter set forth in the claims.

Figure 1:
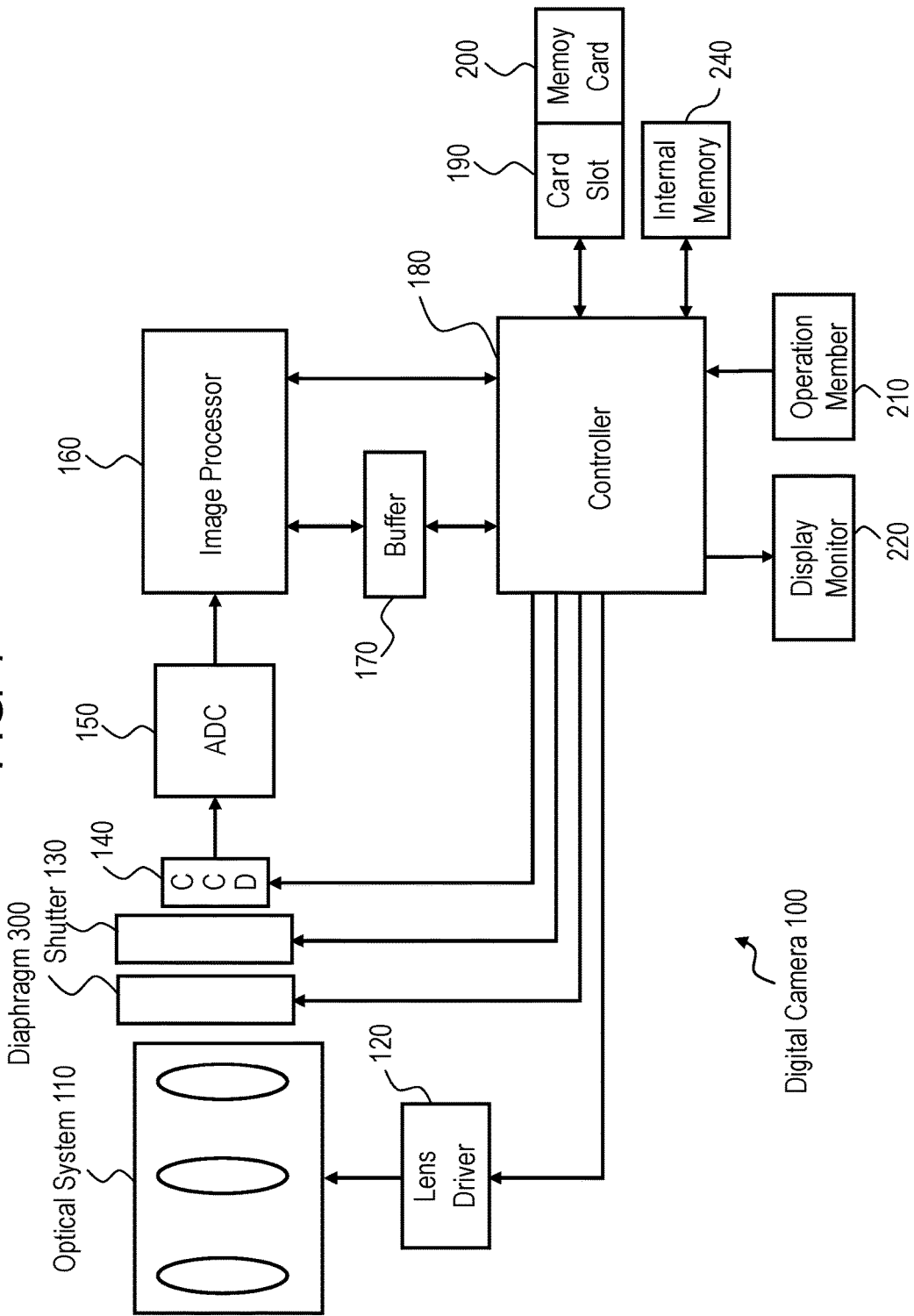
FIG. 1 is a diagram illustrating a configuration of a digital camera according to the present disclosure.

Exemplary embodiments of an imaging device according to the present disclosure will be described below with reference to the drawings.
First Exemplary Embodiment
 1. Configuration of Digital Camera Firstly, an example of an electric configuration of a digital camera according to the first exemplary embodiment will be described with reference to FIG. 1. FIG. 1 is a block diagram illustrating the configuration of digital camera 100. Digital camera 100 is an imaging device that captures an object image, which is formed with optical system 110 including one or more lenses, by CCD 140.

Image data generated by CCD 140 undergoes various processes in image processor 160, and is stored in memory card 200. The configuration of digital camera 100 will be described below in detail.

Optical system 110 includes a zoom lens, a focus lens, and the like. Optical system 110 can enlarge or reduce an object image by moving the zoom lens along an optical axis. Optical system 110 can also adjust a focus of an object image by moving the focus lens along the optical axis.

Lens driver 120 drives various lenses included in optical system 110. Lens driver 120 includes a zoom motor that drives the zoom lens, and a focus motor that drives the focus lens, for example.

Diaphragm 300 adjusts the size of an aperture for light, automatically or according to a user setting, to adjust an amount of transmitting light.

Shutter 130 is a unit to block light transmitting to CCD 140. Shutter 130 constitutes an optical system unit that controls optical information indicating an object image, together with optical system 110 and diaphragm 300.

CCD 140 captures an object image formed by optical system 110 to generate image data. CCD 140 includes a color filter, a light-receiving element, and an AGC (Auto Gain Controller). The light-receiving element converts an optical signal collected by optical system 110 into an electric signal to generate image information. The AGC amplifies the electric signal output from the light-receiving element. CCD 140 also includes a drive circuit that performs various operations such as exposure, transfer, electronic shutter, and the like. The details will be described later.

ADC 150 (A/D converter: analog-digital converter) converts the analog image data generated by CCD 140 into digital image data.

Image processor 160 performs various processes to the digital image data, which is generated by CCD 140 and converted, in response to the control of controller 180. Image processor 160 generates image data that is to be displayed onto display monitor 220 or generates image data that is to be stored in memory card 200. For example, image processor 160 performs various processes such as a gamma correction process, a white balance correction process, or a flaw correction process to the image data generated by CCD 140. Image processor 160 also compresses the image data generated by CCD 140 in a compression format or the like according to H.264 standard or MPEG2 standard. Image processor 160 can be implemented by a DSP (Digital Signal Processor) or a microcomputer. In addition, image processor 160 can generate image data of a video having about 4000×2000 pixels, (4K video image data), based on the image data generated by CCD 140. Image processor 160 can perform various processes described below to the generated 4K video image data.

Controller 180 is a control unit (one example of a controller) that entirely controls digital camera 100. Controller 180 can be implemented by a semiconductor element. Controller 180 may be configured by only hardware, or may be implemented by a combination of hardware and software. Controller 180 can be implemented by a microcomputer, a CPU, an MPU, an ASIC, an FPGA, and the like.

Buffer 170 functions as a work memory for image processor 160 and controller 180. Buffer 170 can be implemented by a DRAM (Dynamic Random Access Memory), a ferroelectric memory, or the like.

Memory card 200 can be inserted and removed to or from card slot 190. Card slot 190 is mechanically and electrically connectable to memory card 200.

Memory card 200 includes therein a flash memory, a ferroelectric memory, or the like, and can store data such as an image file generated by image processor 160.

Internal memory 240 is configured by a flash memory, a ferroelectric memory, or the like. Internal memory 240 stores a control program or the like for controlling the whole of digital camera 100.

Operation member 210 is a general term for a user interface accepting an operation from a user. A selection button, an enter button, and the like which receive an operation from a user correspond to operation member 210.

Display monitor 220 can display an image (through image) indicated by image data generated by CCD 140 or an image indicated by image data read from memory card 200. Display monitor 220 can also display various menu screens on which the user performs various settings of digital camera 100. Display monitor 220 is formed of a liquid crystal display device or an organic EL display device.

Figure 2:
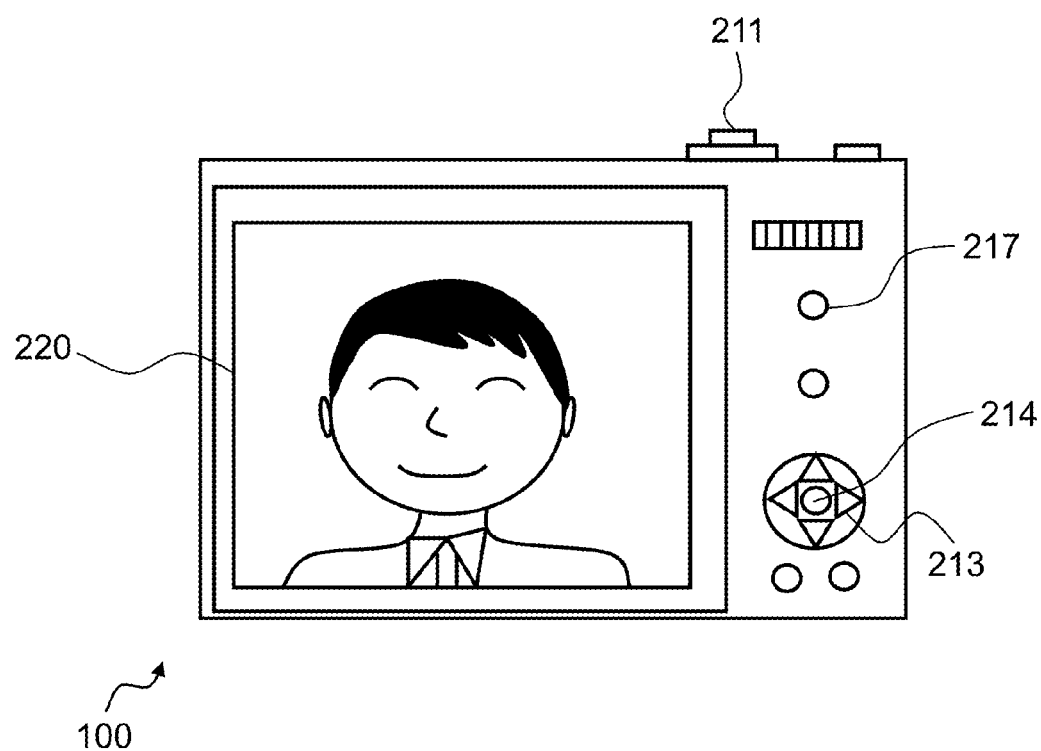
FIG. 2 is a back view of the digital camera.

FIG. 2 is view illustrating the back surface of digital camera 100. Operation member 210 includes members that accept an operation by a user, such as a button, a lever, a dial, and a touch panel. For example, as illustrated in FIG. 2, operation member 210 includes release button 211, selection button 213, enter button 214, a video recording button 217, and the like. When accepting an operation from the user, operation member 210 transmits various instruction signals to controller 180.

Release button 211 is a two-step push button. When release button 211 is half pressed by the user, controller 180 executes an autofocus control (AF control), an autoexposure control (AE control), or the like. When release button 211 is fully pressed by the user, controller 180 records, on memory card 200 or the like, image data which is captured at the timing of the pressing operation, as a recorded image.

Selection button 213 is a push button provided at upper, lower, left, and right sides. The user can move a cursor, or select one of various condition items displayed on display monitor 220 by pressing selection button 213 at any of the sides.

Enter button 214 is a push button. When enter button 214 is pressed by the user while digital camera 100 is in a capturing mode or a reproduction mode, controller 180 displays a menu screen on display monitor 220. The menu screen is used for setting various conditions for capturing/reproduction. When enter button 214 is pressed while a setting item of various conditions is selected, controller 180 determines the setting of the selected item.

2. Operation of Digital Camera

Digital camera 100 according to the present exemplary embodiment has, as an operation mode, a video recording mode for recording a video and a reproduction mode for reproducing a recorded image. Further, the video recording mode includes a normal video mode (one example of a first video mode) for capturing a normal video and a photo/video mode (one example of a second video mode) for capturing a video which enables a cutout of a high-quality still image.

2.1 Photo/Video Mode

The photo/video mode is for capturing a video from which a still image is to be cut out. Specifically, as illustrated in FIG. 3, one frame image is cut out from a plurality of frame images constituting a video which is captured in the photo/video mode, and the cutout image is recorded as a still image. In the photo/video mode, a video is recorded with capturing settings more suitable for recording a still image than in the normal video mode.

The user can cut out an image (frame image) of a desired scene, as a still image, from a video captured in the photo/video mode. Therefore, the user can select a desired image from frame images constituting a video which is captured without being conscious of a photo opportunity, and generate an image captured at the decisive moment, which has been difficult in the related art. Specifically, the user can easily take a picture of happenings/incidents that can occur any time or a take a picture of an instantaneous state of an object (liquid, flame, etc.) which changes its state with time.

In a video captured in the photo/video mode, quality of an image cut out as a still image takes priority over a quality level or image quality (hereinafter referred to as image quality) as a video, since each frame image constituting the video is cut out as a still image. Therefore, when the photo/video mode is set, various settings relating to capturing are automatically (compulsorily) set to set values specific to the photo/video mode and suitable for recording a still image. FIG. 4 shows settings specific to the photo/video mode as compared to the settings in the normal video mode. In the settings specific to the photo/video mode, various set values are set to those that can enhance image quality of a still image cut out from a video.

For example, image quality (resolution) is set to a value designated by a user within the range from VGA to 4K (about 4000 pixels×2000 pixels) in the normal video mode. On the other hand, in the photo/video mode, image quality (resolution) is set to 4K which is the highest settable resolution in digital camera 100. According to this setting, a high-quality frame image can be recorded, and a high-quality still image can be cut out. In the normal video mode, a frame rate of a video is set to a value designated by a user from 24 p, 25 p, and 30 p. On the other hand, in the photo/video mode, a frame rate is set to 30 p which is the highest value. When the frame rate is set to the highest value, a time interval between frames in a video becomes short, whereby a timing at which an image can be cut out as a still image is increased even if the recording is performed for the same amount of time.

Note that, the photo/video mode is not limited to a 4K video of about 4000×2000 pixels. If the mode is a video mode with high resolution, a still image having higher image quality can be obtained. For example, digital camera 100 may be configured to be capable of setting an 8K video image having 8000×4000 pixels as image quality set in the photo/video mode. It is only necessary that digital camera 100 can set the highest resolution in the normal video mode. Alternatively, it is likely that a video having high resolution cannot be recorded with the highest frame rate captured by a sensor (CCD 140) of the camera, since the video having high resolution generally requires a lot of processing performances. In this case, it is desirable that two modes, which are "quality priority" and "photo opportunity priority", are set for the settings of the photo/video mode. In the quality priority mode, a video mode with the highest resolution is selected. On the other hand, in the photo opportunity priority mode, a video mode which can ensure the highest recording frame rate is selected from video modes having a certain level or higher resolution. With this, the user can more intuitively select a video mode in which a number of pixels of a cutout still image is large and a video mode having higher possibility of capturing the decisive moment (having high frame rate of a video).

Further, as for a color tone as well, a color setting specially set for cutting out a still image has to be set. Therefore, a color tone different from that for a video is set. In addition, as for an exposure setting, any one of a P-mode (program mode), an A-mode (exposure priority mode), an S-mode (shutter speed priority mode), and an M-mode (manual mode) set by the user is set in the normal video mode. On the other hand, in the photo/video mode, the S mode is set.

As for a shutter speed, in the normal video mode, a shutter speed is set to a value corresponding to a frame rate of a video to be recorded (for example, 1/30 second when a frame rate is 30 frames per second). On the other hand, in the photo/video mode, a shutter speed is set to a value implementing higher speed than the value in a frame period (for example, less than 1/30 second when a frame rate is 30 frames per second). In the normal video mode, a shutter speed is set to a value which is around a frame rate of a video so that a smooth video is reproduced when the video is reproduced. In the case where an object that is a moving animal, for example, is captured according to the above setting, a smooth video image is obtained as a video. However, when an image is cut out as a still image, the obtained still image may include a blurred object. Thus, image quality of the still image is bad. In view of this, in the present exemplary embodiment, a shutter speed in the photo/video mode is set to a value higher than that of a shutter speed in the normal video mode. With this, a high-quality still image with less blur of an object can be cut out, when a still image is cut out. In this way, in the photo/video mode, a shutter speed is set with priority being given to image quality of a still image over image quality of a video.

In the normal video mode, a part of a brightness level range of a digital camera is set for a range of a brightness level due to the reason in which a video image is displayed on a TV using HDMI (registered trademark) standard. On the other hand, it is undesirable to limit the brightness level in the photo/video mode, because priority is given to image quality of a still image. In view of this, digital camera 100 according to the present exemplary embodiment sets the brightness level range to the maximum value of the brightness level range of digital camera in the photo/video mode.

In the normal video mode, an aspect ratio of an image is fixed to 16:9. In the photo/video mode, an aspect ratio is set to any one of 16:9, 4:3, 3:2, and 1:1 according to the user setting.

As for an upper-limit value of automatic ISO, an upper-limit value of automatic ISO sensitivity in the photo/video mode is set to a value higher than an upper-limit value of ISO sensitivity in the normal video mode. For example, the upper limit of automatic ISO is set to 6400 in the normal video mode. On the other hand, in the photo/video mode, the upper limit of the automatic ISO is set to be 25600, which is higher than that in the normal video mode. Thus, a shutter speed higher than the shutter speed in the normal video mode can be set in the photo/video mode.

An autofocus (AF) tracking speed, a white balance (WB) tracking speed, and an autoexposure (AE) tracking speed in the photo/video mode are also set to values higher than those in the normal video mode. When the autofocus tracking speed and the like are set to be higher, a quality level of a video is deteriorated, since a focus wildly varies with respect to particularly a moving object. Therefore, it is not preferable to control autofocus at high speed in the normal video mode. However, in the photo/video mode, the number of frames in which an object is appropriately focused is increased by controlling the autofocus tracking speed and the like to be higher, and therefore, a video which suits the purpose of cutting out a still image can be recorded. In the photo/video mode, priority is placed on image quality of a still image, and the autofocus tracking speed, the white balance tracking speed, and the autoexposure tracking speed are compulsorily set to higher values, although image quality of a video is deteriorated.

When the photo/video mode is set, the above-mentioned set values suitable for recording a still image are automatically (compulsorily) set, whereby a video specialized in cutting out a still image can be recorded. Accordingly, a high-quality still image can be cut out from a video captured in the photo/video mode.

Figure 5B:
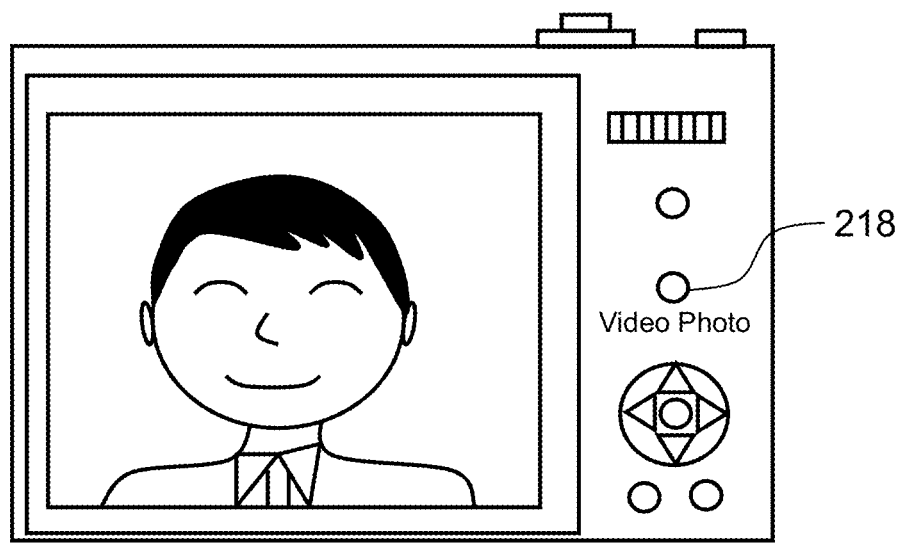
FIG. 5B is a diagram describing an operation member for setting the photo/video mode.

In order to set the video mode to the photo/video mode, selection items for photo/video may be selected from a setting menu as in screen A illustrated in FIG. 5A. Alternatively, as illustrated in FIG. 5B, exclusive button 218 for setting the mode to the photo/video mode may be provided to digital camera 100, and the photo/video mode may be set through an operation on exclusive button 218. Alternatively, the photo/video mode may be set through an operation on an operation system such as a mode selection dial provided to digital camera 100.

Besides ON/OFF setting of the photo/video mode, a color tone for photo/video or a recording method or image quality of a video can be set on the video setting screen in screen A illustrated in FIG. 5A. When the settings for the photo/video mode are set, the screen is changed to a detail setting screen for the photo/video mode in screen B illustrated in FIG. 5A. On this screen, the user can set an aspect ratio of an image in the photo/video mode. In addition, digital camera 100 desirably displays the setting details, which are automatically set in the photo/video mode, on screen B at that time. This is because it is difficult for the user to remember a lot of settings such as a viewing angle in setting the video settings. Accordingly, convenience of the user is enhanced with the display as described above.

Since the photo/video mode is specialized in cutting out a still image as described above, image quality of a video is not always good. Therefore, when the photo/video mode is set ON, a warning screen or a reconfirmation message as in screen C illustrated in FIG. 5A is desirably presented to the user. This configuration can prevent the user from selecting an inappropriate video mode. When the user selects the photo/video mode on screen C illustrated in FIG. 5A, the screen returns to the video setting screen. At that time, the exposure setting, the brightness level, and the like which are automatically set in the photo/video mode are desirably displayed in a different display manner, such as grayout, as in screen D illustrated in FIG. 5A.

2.2 Video Recording

Figure 6:
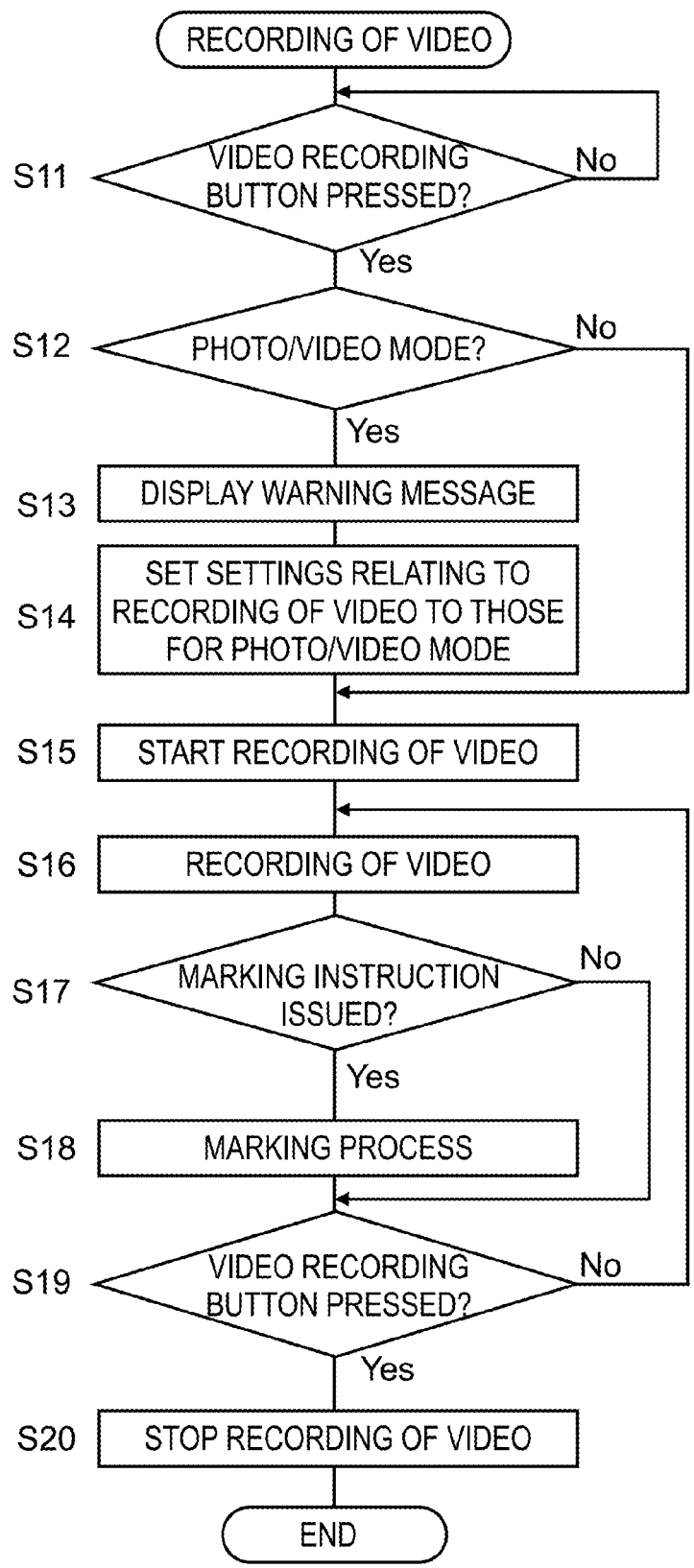
FIG. 6 is a flowchart illustrating a video recording operation of the digital camera.

A video recording operation of digital camera 100 according to the present exemplary embodiment will be described with reference to the flowchart in FIG. 6. When a user presses video recording button 217, digital camera 100 starts recording of a video, and when video recording button 217 is pressed during the recording of the video, the recording of the video is stopped.

When video recording button 217 at the back surface of digital camera 100 is pressed by the user (step S11), controller 180 determines whether the set video mode is the normal video mode or the photo/video mode (step S12).

Figure 7A:
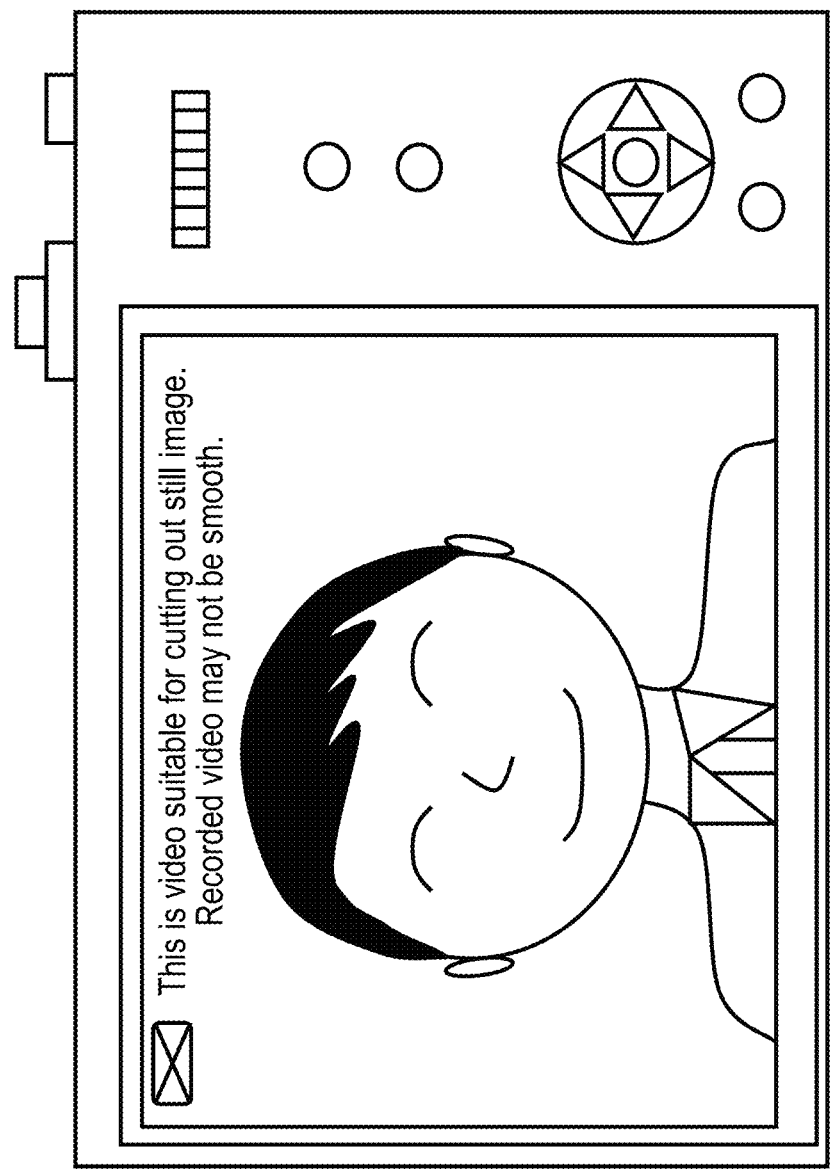
FIG. 7A is a diagram for describing a warning message displayed during capturing in the photo/video mode.
Figure 7B:
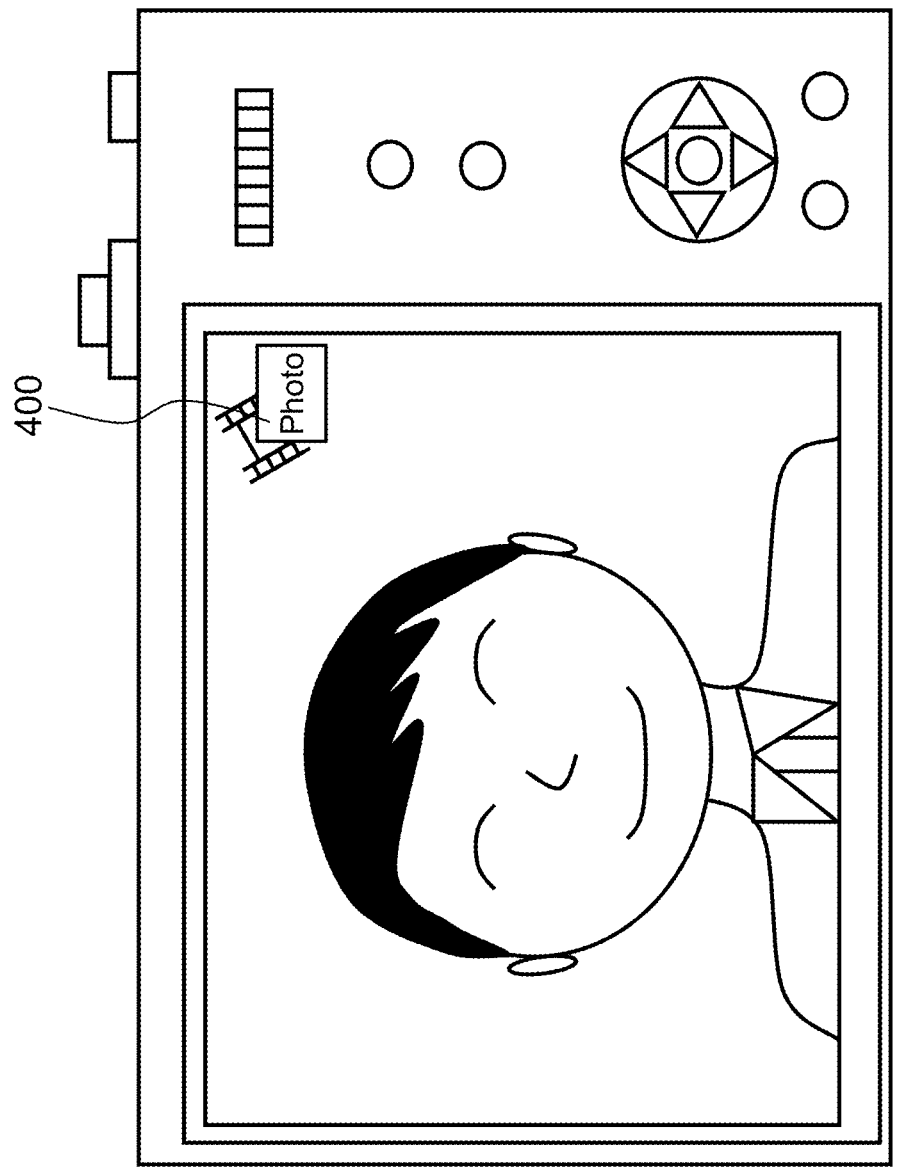
FIG. 7B is a diagram for describing an icon displayed during capturing in the photo/video mode.

When the photo/video mode is set (Yes in step S12), controller 180 displays a message to warn a user that the photo/video mode is set, as illustrated in FIG. 7A (step S13). In the photo/video mode, a shutter speed is set to be higher than that in the normal video mode. Therefore, a video image is not smooth, and the photo/video mode is not suitable for capturing and reproducing a video. Therefore, in order to prevent the user from capturing an image in the photo/video mode against the user's intention, an icon different from that used in the normal video mode is displayed, and a warning is displayed. Note that, such a warning may be displayed when the video mode is changed from the normal video mode to the photo/video mode. In addition, during the recording of the video, as illustrated in FIG. 7B, icon 400 is desirably displayed on display monitor 220 to clearly indicate that the photo/video mode is set.

When the photo/video mode is set, controller 180 sets set values relating to the video capturing to set values for the photo/video mode (step S14). The set values for the photo/video mode are suitable for recording a still image as illustrated in FIG. 4. Note that, when the normal video mode is set, controller 180 uses the settings for the normal video mode which are currently set.

Then, controller 180 starts recording of a video (step S15). Thereafter, controller 180 records the video based on the set values until receiving an instruction of stopping the recording of the video (step S16). During the recording of the video, video data is recorded on memory card 200. Note that, in the normal video mode and the photo/video mode, a video is recorded according to a predetermined format for video data. For example, a video is recorded according to MP4 standard (H.264/MPEG-4 AVC system).

Here, digital camera 100 according to the present exemplary embodiment can perform, during capturing of the video, a marking operation to the vicinity of a target frame that is to be cut out later. In view of this, controller 180 determines whether or not a marking instruction is issued from the user (step S17). The marking is an operation for designating a frame image in a video at a certain timing. When the marking instruction is issued (Yes in step S17), the marking process is executed (step S18). The details of the marking process will be described below.

When video recording button 217 is pressed during recording of the video (Yes in step S19), controller 180 stops the video recording operation (step S20). Controller 180 continues the video recording operation until video recording button 217 is pressed (step S19).

2.3 Cutting Out Still Image from Video Data

Figure 8:
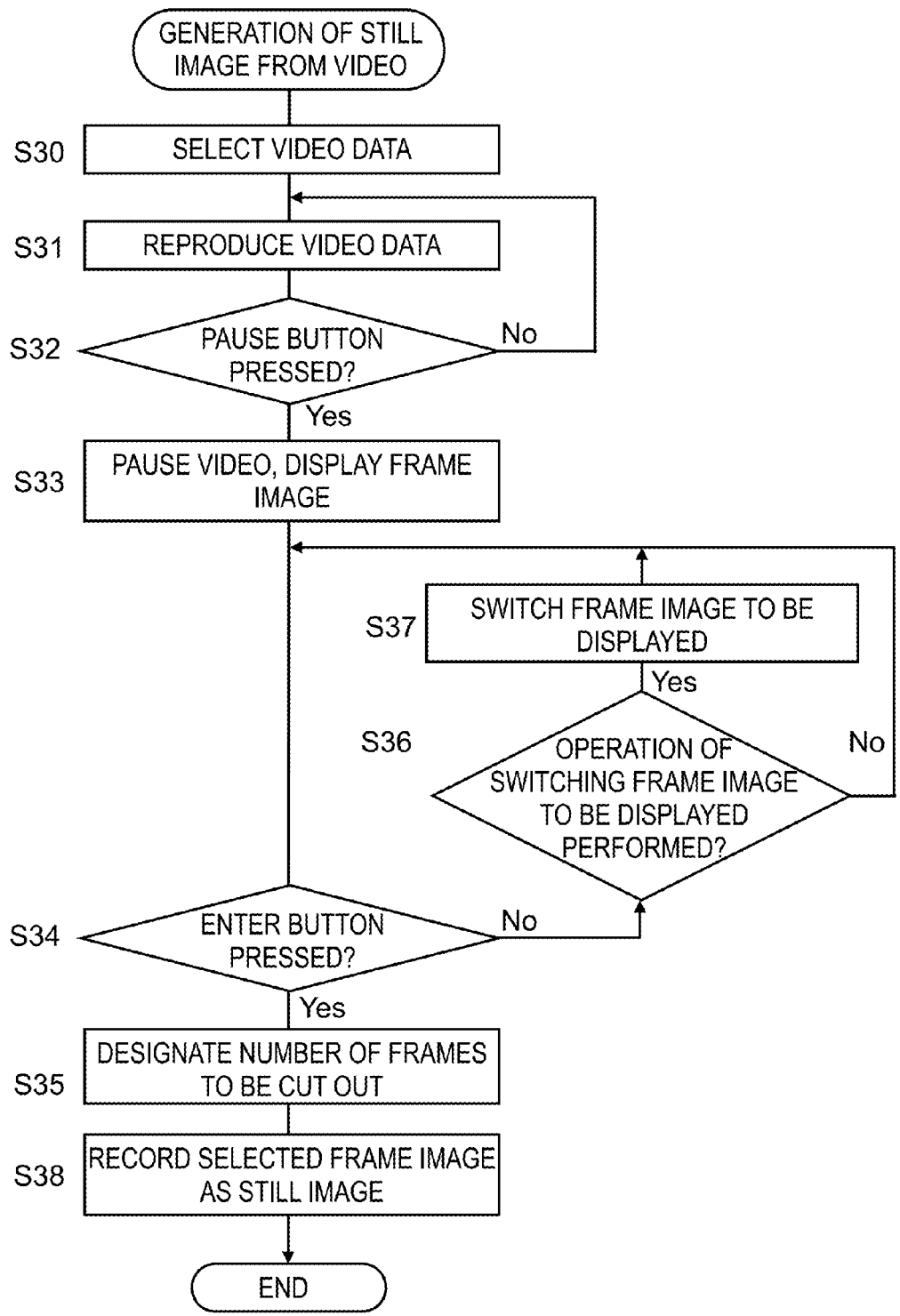
FIG. 8 is a flowchart illustrating a process for cutting out a still image from video data in the digital camera.
Figure 9A:
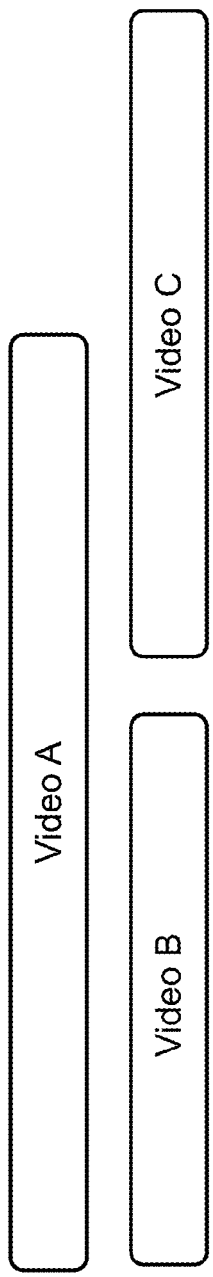
FIG. 9A is a diagram for describing the state in which three video data sets recorded in the photo/video mode are stored in a memory card.
Figure 9B:
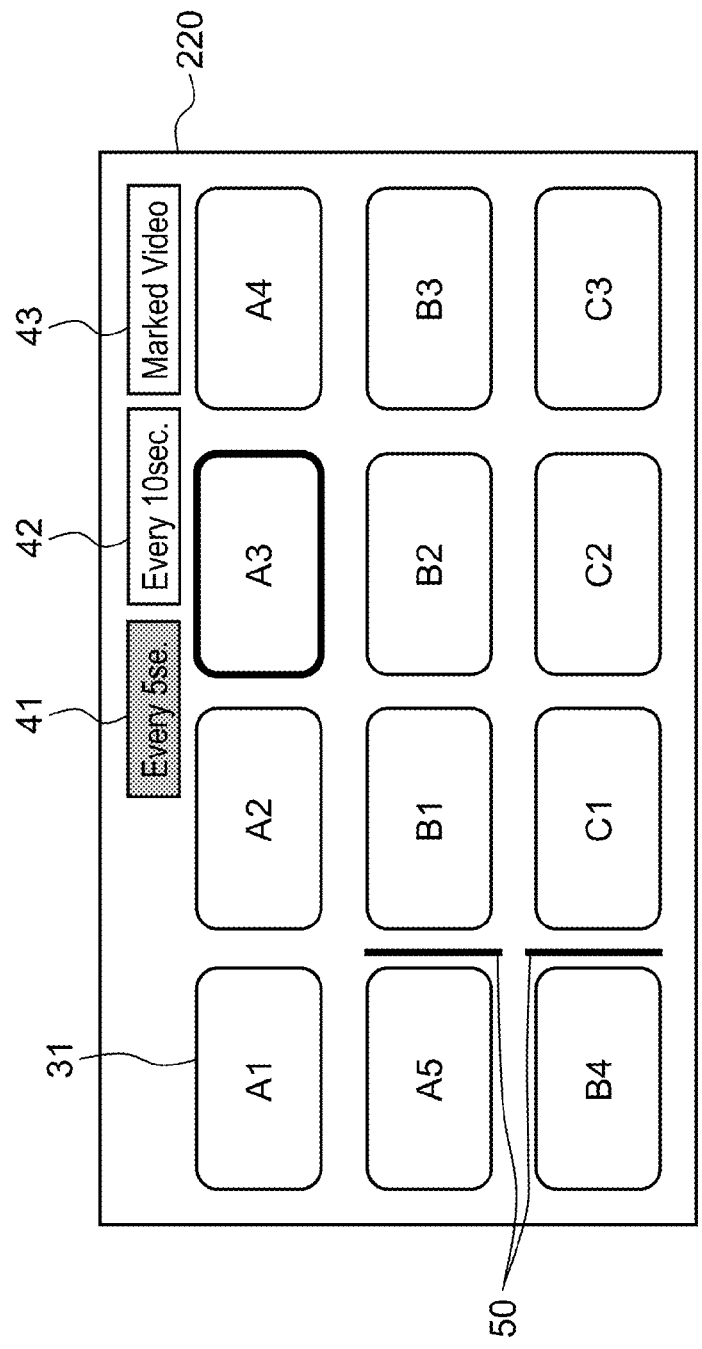
FIG. 9B is a diagram for describing a screen for cutting out a still image from video data.

A process of cutting out a still image from recorded video data in the photo/video mode will be described with reference to FIGS. 8 and 9. FIG. 8 is a flowchart illustrating the process of cutting out a still image from video data. FIG. 9A illustrates three videos A, B, and C recorded on memory card 200 in the photo/video mode. FIG. 9B illustrates an image selection screen (operation screen) used for selecting a video from which a still image is to be cut out.

When the user presses a predetermined button of digital camera 100, controller 180 displays the image selection screen illustrated in FIG. 9B on display monitor 220. On the image selection screen, thumbnail images 31 of frames for each of videos A to C at a predetermined time interval are displayed. Specifically, representative thumbnail images of video data divided at a predetermined time interval (the image of the first frame of the divided video data) for each of videos A to C are displayed on the image selection screen. In the example in FIG. 9B, thumbnail images 31 corresponding to frame images at an interval of five seconds are displayed for each of video A, video B, and video C. For example, thumbnail images 31 (A1, A2, . . . ) of the frame images at an interval of five seconds are displayed for video A. The time interval of frames can be changed to five seconds or ten seconds by buttons 41 and 42. Since thumbnail images 31 of frames at a predetermined time interval are displayed as described above, the user can efficiently select a video including a desired scene, thereby being capable of quickly finding a scene the user intends to cut out.

The user can select one thumbnail image 31 by moving a cursor on the image selection screen through an operation on selection button 213 or a touch panel provided at the back surface of the camera. When one thumbnail image 31 is selected by the user (step S30), controller 180 reproduces the video of the selected thumbnail image 31 from the frame of selected thumbnail image 31 (step S31). During the image reproduction, a screen on which predetermined operation buttons are displayed as illustrated in FIG. 10 is displayed on display monitor 220. With the operation buttons on this screen, the user can perform a reproduction operation, a stop operation, or the like to the video data. Further, in a video recorded in the photo/video mode, icon 400 is desirably displayed on display monitor 220. With this, the user can easily recognize that this is a video recorded in the photo/video mode suitable for cutting out a still image.

When a pause button is pressed by the user during the video reproduction (step S32), controller 180 pauses the display of the video, and displays the frame image (still image) at the stopped position (step S33).

Screen A illustrated in FIG. 11 shows an example of a still image displayed on display monitor 220 during pausing. Frame feed buttons 55a and 55b are displayed on display monitor 220. Until enter button 214 illustrated in FIG. 10 and the like is pressed (No in step S34), the user can advance or return the frame of the still image frame by frame by operating frame feed buttons 55a and 55b. For example, when frame feed button 55a is operated, the image of the previous frame of the currently displayed image is displayed on display monitor 220. Further, when frame feed button 55b is operated, the image of the next frame of the currently displayed image is displayed on display monitor 220. When frame feed buttons 55a and 55b are operated (step S36), controller 180 switches the image displayed on display monitor 220 (step S37). The user displays a desired image on display monitor 220 by operating frame feed buttons 55a and 55b.

When enter button 214 is pressed by the user (Yes in step S34), the number of frames to be cut out is designated next (step S35). When the number of frames to be cut out is designated, the designated number of frames is cut out from the currently-displayed image (frame image) as still images, and recorded on memory card 200 (step S38). Specifically, when enter button 214 is pressed, a confirmation message to the user as in screen B illustrated in FIG. 11 is displayed. When an instruction ("Yes") of the user to the confirmation message is input, controller 180 cuts out the currently-displayed frame data from the video data, and records the resultant data on memory card 200 as a still image. Note that, video data recorded in the photo/video mode is recorded in a video format (MP4), and interframe compression is performed. Therefore, upon cutting out a frame of video data as a still image, controller 180 converts the data of the frame image into a format for a still image (e.g., JPEG), and records the converted data.

In this way, still image data can be cut out from video data.

Figure 12:
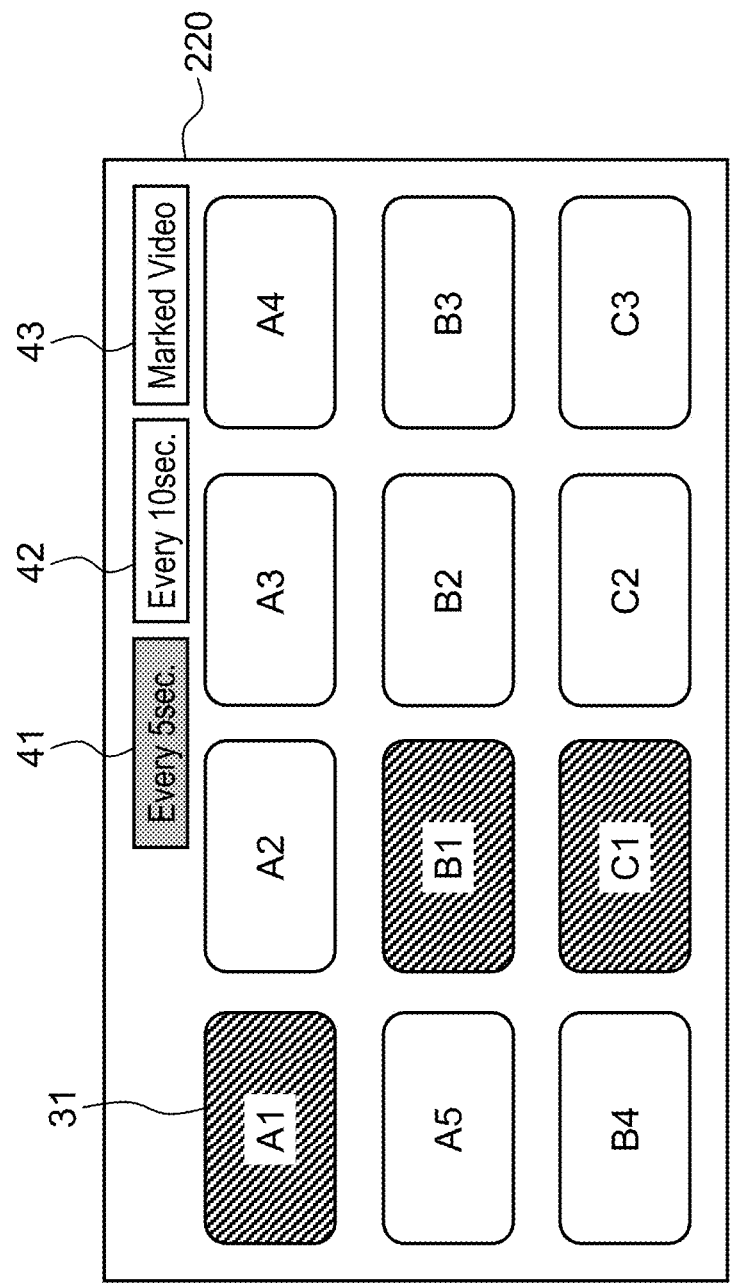
FIG. 12 is a diagram illustrating another example of a display indicating a separation between video data.

On the image selection screen illustrated in FIG. 9B, thumbnail images 31 (B1 to B4 ) for video B and thumbnail images 31 (C1, C2, . . . ) for video C are displayed subsequent to thumbnail images 31 (A1 to A5) for video A. As described above, thumbnail images 31 for video A, video B, and video C are sequentially displayed. Therefore, separators 50 indicating the boundary of videos are displayed to allow the user to recognize the boundary between videos. Separator 50 is not limited to the one illustrated in FIG. 9B. The color of thumbnail images 31 (A1, B1, C1) at the head of the boundary of the respective videos may be different from the colors of other thumbnail images as illustrated in FIG. 12.

Figure 13:
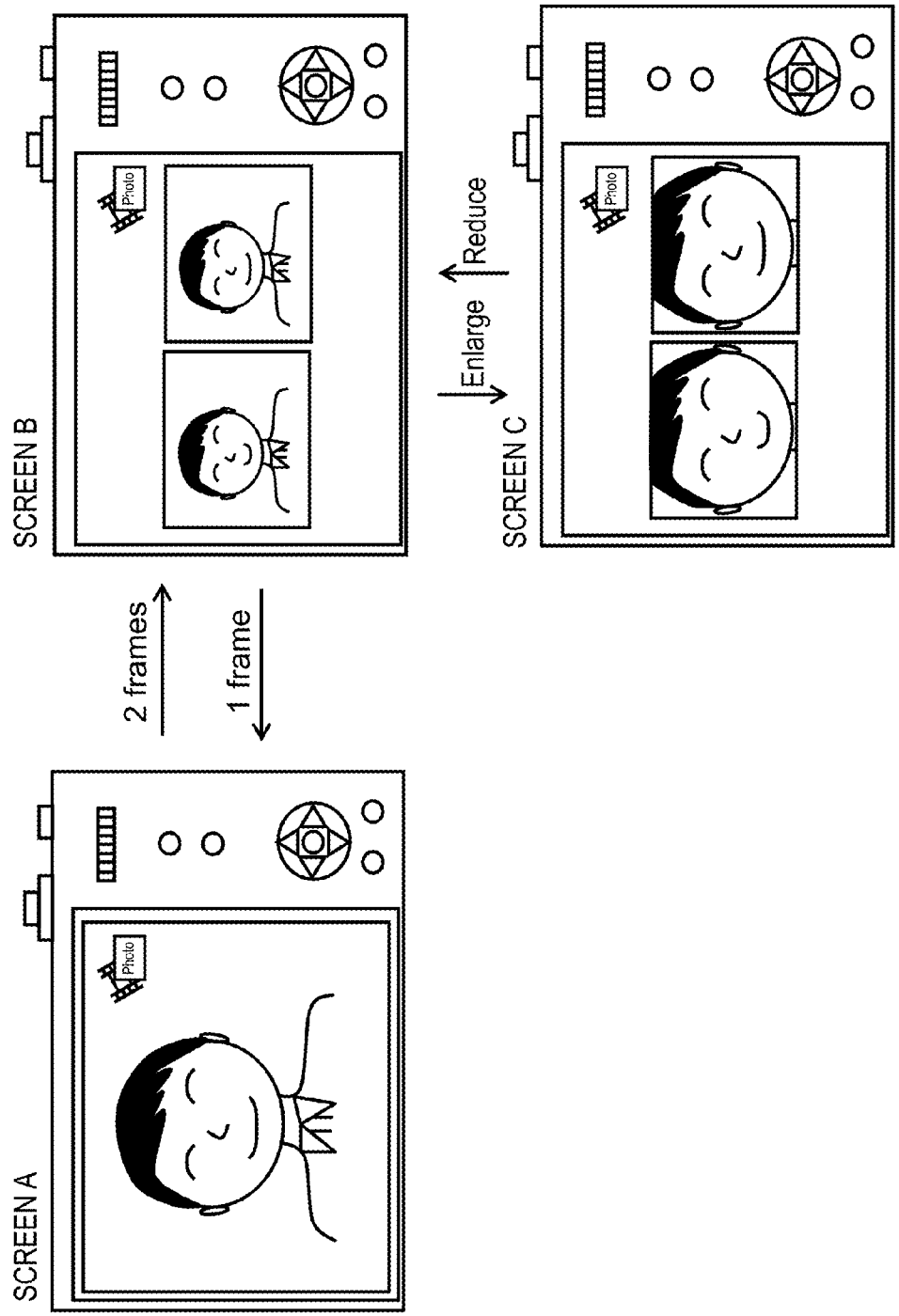
FIG. 13 is a diagram illustrating an example of a change in a display manner of the digital camera.

The details of step S33 in the flowchart in FIG. 8 will be described with reference to FIG. 13. Screen A in FIG. 13 shows a still image (one frame) that is to be cut out from a video. However, when a still image is cut out from a video, the user can compare pictures the user desires to cut out on the frame basis in detail, thereby being capable of selecting a frame more suitable to be cut out. For this, digital camera 100 desirably has a function of displaying a frame which is paused and the previous frame or the next frame of this frame, side by side, on the screen during the pause, by a predetermined operation (see screen B in FIG. 13). Digital camera 100 also desirably has a function (zoom function) of enlarging the same specific regions on the adjacent frames and reducing the enlarged images according to an instruction of the user (see screen C in FIG. 13). Thus, the user can easily select a still image the user desires to cut out in more detail.

2.4 Marking Process

The marking process (step S18 in the flowchart in FIG. 6) will be described below.

Figure 14:
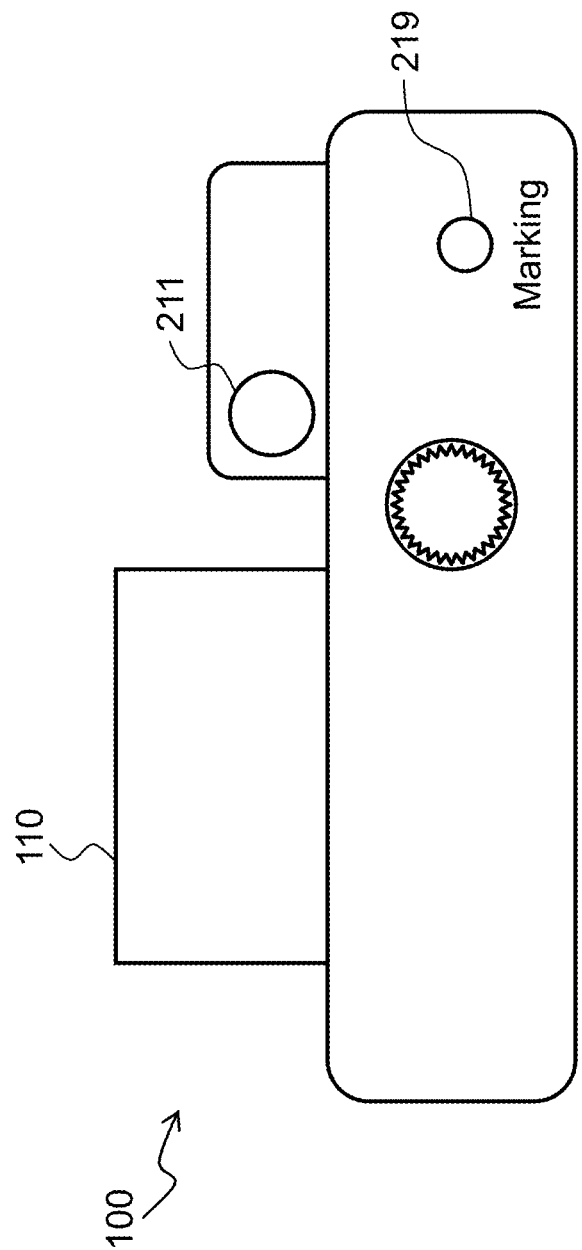
FIG. 14 is a diagram illustrating an arrangement example of a marking button of the digital camera.

Digital camera 100 has a function of marking, during capturing of a video, the vicinity of a target frame that is to be cut out later. The marking instruction is issued by the depression of a predetermined operation button. Performing the marking process indicates that a frame is to be cut out as a still image or the user intends to cut out a frame as a still image. Therefore, a button for the marking process is desirably provided on the top surface of digital camera 100 where release button 211 is provided as illustrated in FIG. 14. This button is referred to as marking button 219. With this configuration, the user can perform the marking process to select a candidate of a still image to be cut out in the photo/video mode in the same manner as in pressing release button 211 for capturing a picture. In the description below, marking button 219 is assumed to be provided to digital camera 100.

When marking button 219 is pressed by the user during video recording, a frame being recorded at that time is marked. The marked frame becomes an index for the user to search a frame that is to be cut out as a still image. In digital camera 100 according to the present exemplary embodiment, the number of frames that can be marked is limited.

Figure 15:
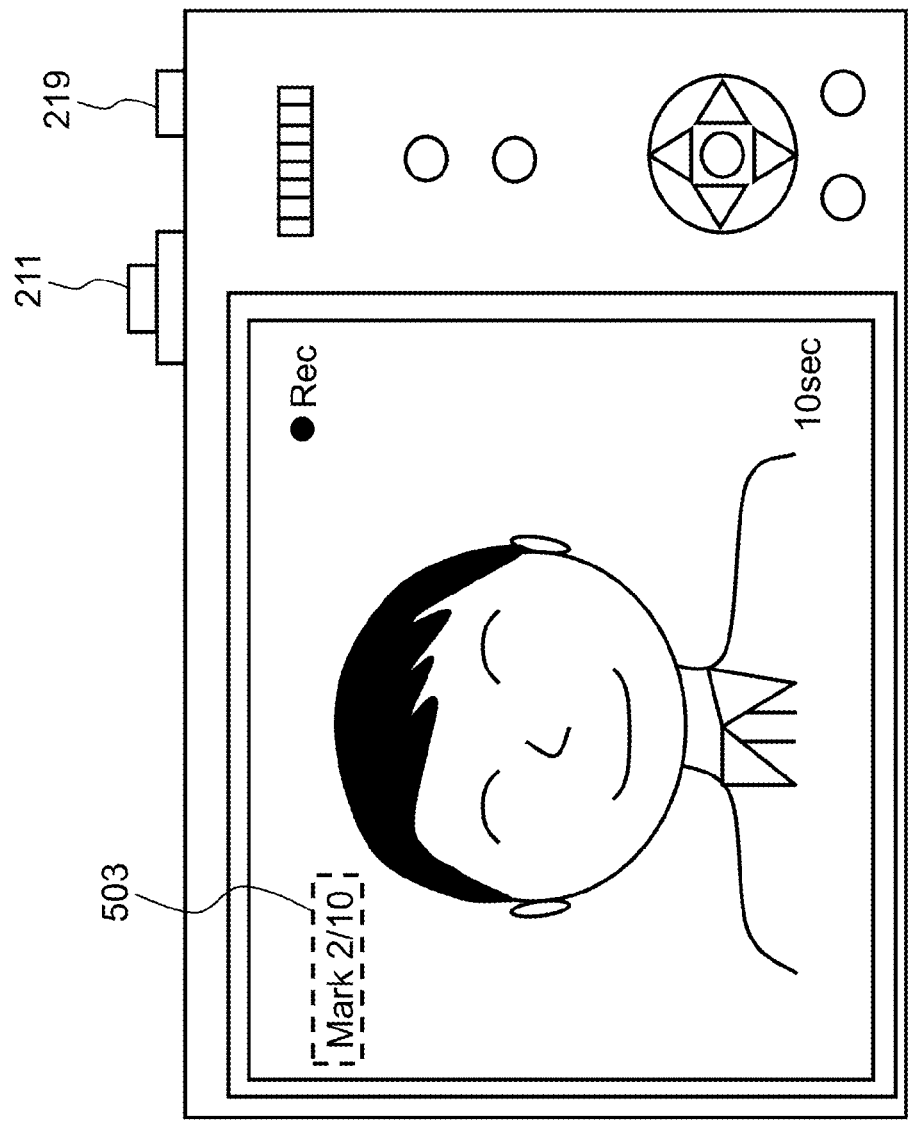
FIG. 15 is a diagram describing a display displayed when marking is performed during recording of a video and an operation button for performing marking.

When a marking instruction is issued during recording of a video, controller 180 displays a display (marking display 503) indicating that the marking is performed on display monitor 220 as illustrated in FIG. 15. In digital camera 100, the number of frames that can be marked is limited. Marking display 503 includes information indicating the number of marking times and the maximum number (upper limit) of frames that can be marked. The user can recognize the number of marking times at present by referring to marking display 503, and this can prevent the situation in which the marking times reaches the upper limit due to the unnecessary marking performed by the user, and thus, an important scene cannot be marked. In the case where there is no limitation on the number of marking times, the information indicating the maximum possible number of marking times is not displayed. The information indicating the number of marking times included in marking display 503 is updated every time the user presses marking button 219.

Figure 16:
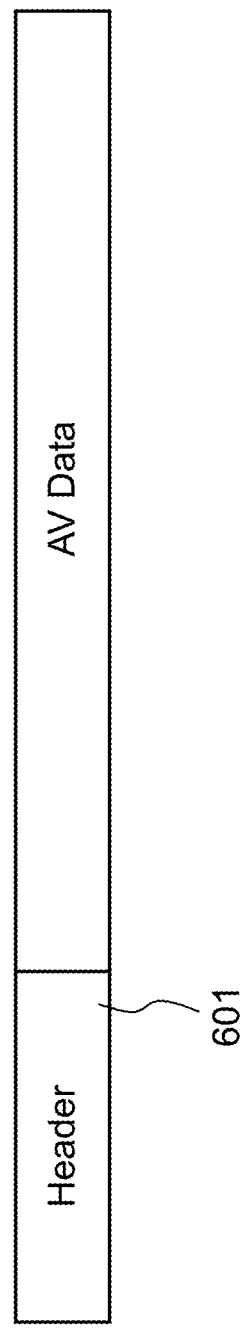
FIG. 16 is a diagram for describing a place where marking information is recorded in a video.
Figure 17:
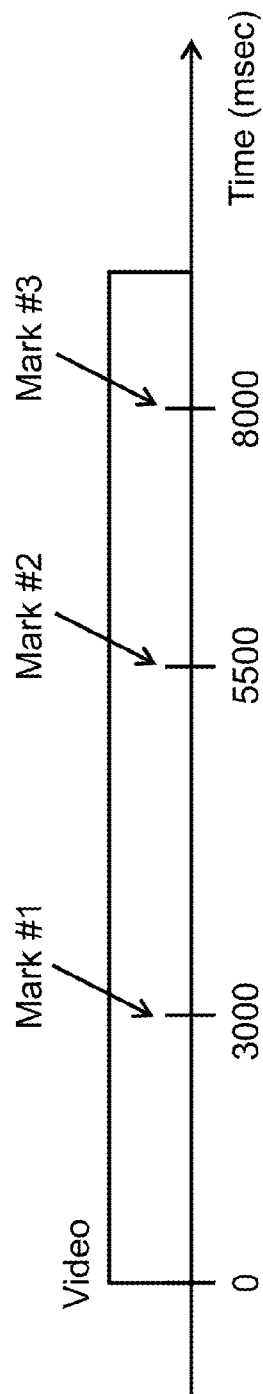
FIG. 17A is a diagram for describing marking of video data.
FIG. 17B is a diagram for describing a marking data base that is updated when a marking instruction is issued while a video is recorded.

When a marking instruction is issued, controller 180 records information indicating a marking timing on a mark data base that manages marking. This mark data base is stored in header 601 of video data illustrated in FIG. 16. In this case, header 601 is information which is added to data and relates to the data itself. A still image/video captured by digital camera 100 includes data (AV data) of the still image/video and a header added to the AV data. For example, it is assumed that, during recording of a video, a marking instruction is issued at the point after 3000, 5500, and 8000 msec have elapsed from the start of the recording by the user, as illustrated in FIG. 17A. In this case, controller 180 records a mark ID for identifying the executed marking in the mark data base in association with the time at which the marking is executed, as illustrated in FIG. 17B. Controller 180 enables retrieval of the marked frame by referring to the data base.

As described above, when an image is reproduced after the recording in the photo/video mode, a plurality of predetermined operation buttons are displayed as being superimposed on the image as illustrated in FIG. 10. With these operation buttons, the user can perform a marking feed operation in addition to a reproduction operation, a stop operation, a fast-forward operation, or the like to the video data. The marking feed operation will be described below.

Cursor 501 (Prey Mark) and cursor 502 (Next Mark) are displayed on display monitor 220 as operation buttons for the marking feed operation. When cursor 501 or cursor 502 displayed on the monitor is touched by the user, controller 180 detects a marked frame image present within a time period before or after the currently-displayed frame by referring to the mark data base, and displays the detected frame image. The operation of cursor 501 or cursor 502 enables jump from one marked image to other marked image. With this, the vicinity of the target frame to be cut out which is designated (marked) during capturing in the photo/video mode can be retrieved in a short time.

In the case where there is no marked frame before and after the currently-displayed frame, cursor 501 or cursor 502 may not be displayed. Alternatively, cursor 501 or cursor 502 may be displayed lightly (gray out).

Further, the operation button for the marking feed operation is not displayed on display monitor 220, but the marking feed operation may be implemented by an existing operation system. For example, the marking feed operation may be performed when left and right buttons of selection button 213 are double-clicked. Alternatively, the marking feed operation may be performed when a fast-feed/fast-rewind cursor displayed on the reproduction screen is double-tapped. When the existing operation system is used as described above, the need to additionally provide an operation system for the marking feed operation is eliminated, whereby a space can effectively be used.

Further, digital camera 100 desirably displays marking display 503 for a certain period of time. According to this configuration, the user can recognize that the marked frame passes by. Therefore, the user presses the pause button after the display of marking display 503, and can easily find frames around the marked frame, that is, frames around the frame the user intends to cut out as a still image.

In addition, cursors 501 and 502 may be displayed only when a predetermined button is pressed. The predetermined button is desirably marking button 219. When the function of marking is exclusively assigned to one button, operability of digital camera 100 is enhanced.

Figure 18:
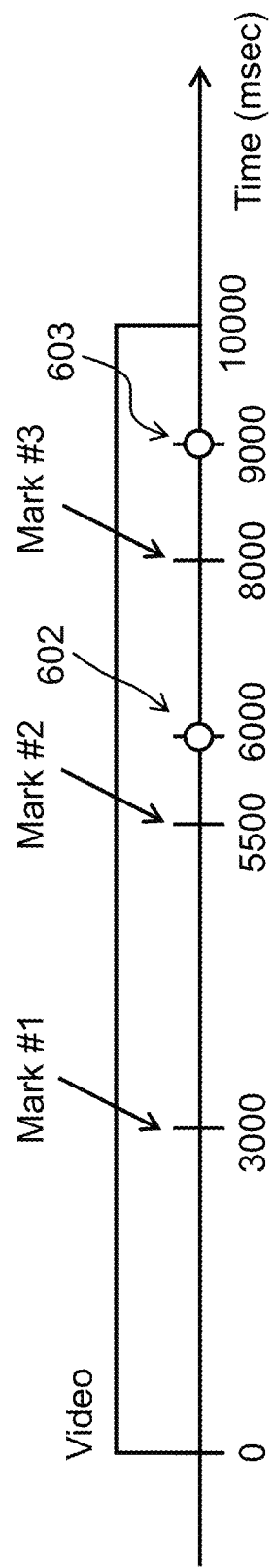
FIG. 18 is a diagram illustrating an example of a process for a transfer between marked frames.

Further, digital camera 100 may have the operability described below to enhance operability of digital camera 100. It is assumed that there is a video of 10000 msec to which a marking instruction is issued at the point after 3000, 5500, and 8000 msec have elapsed from the start of the recording as illustrated in FIG. 18. It is assumed here that the current time is 6000 msec (point 602), and is temporally close to Mark #2 by not more than a predetermined time (here, the predetermined time is 1000 msec, for example). In this case, when the user presses cursor 501, it is desirable that the jump to Mark #1, not to Mark #2, is enabled.

According to this configuration, the effect of preventing the transfer to unintended Mark #2 can be expected, when the user intends to transfer to the point at Mark #1 but due to the time-consuming operation by the user until the user presses the pause button, the display is paused at point 602, and then, cursor 501 is pressed. Further, in the case where cursor 502 is operated when the current reproduction point is 9000 msec (point 603), it is desirable that the transfer to the point at 10000 msec that is the end of the video is enabled, and further, pausing is enabled. With this, the user can easily select a still image near the end.

Figure 19A:
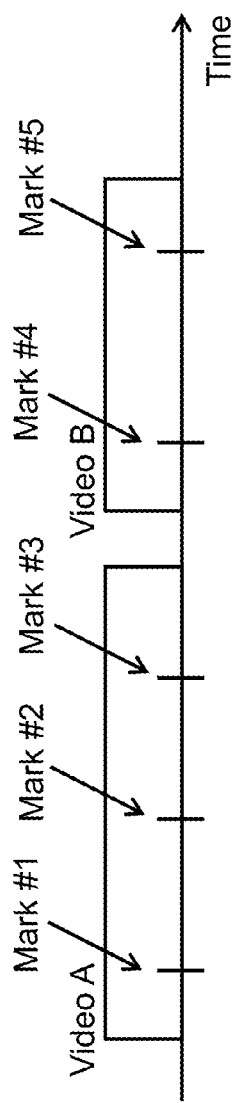
FIG. 19A is a diagram for describing the relationship between video data recorded in the photo/video mode and marking.
Figure 19B:
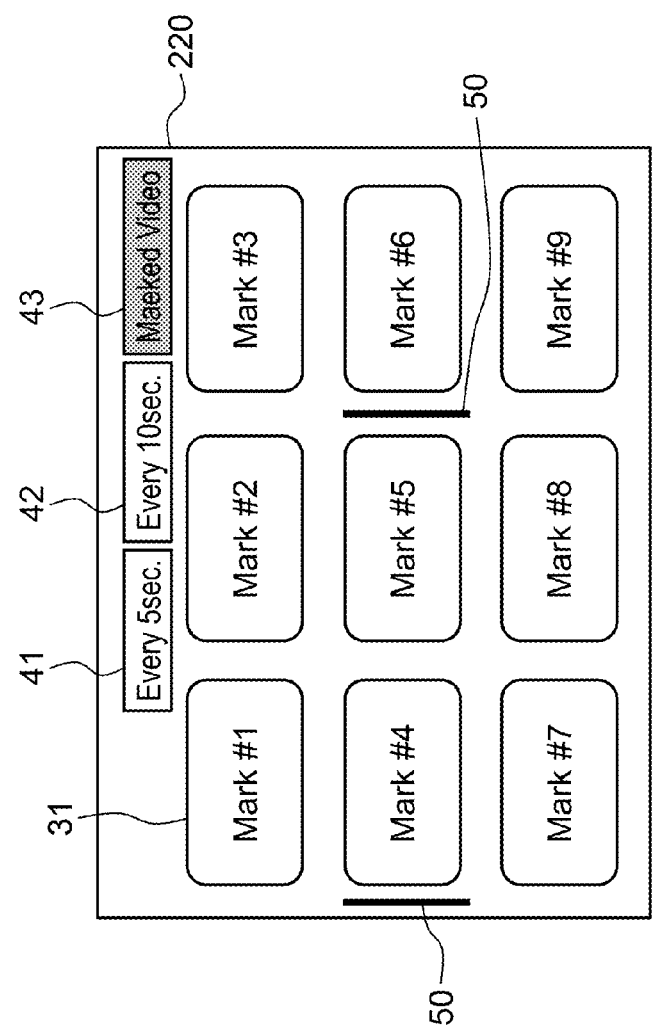
FIG. 19B is a diagram for describing a screen on which a thumbnail image is displayed as a representative image of the marked frame.

When the data to which the marking operation is performed by the user is displayed, each of the marked frames can be displayed as illustrated in FIGS. 19A and 19B, besides the method of dividing a video at a predetermined time interval (e.g., five seconds) and displaying thumbnail images 31, as described previously. In this case, the marked frame is displayed as thumbnail image 31. When the user presses button 43 displayed on display monitor 220, the screen is switched to a screen, as illustrated in FIG. 19B, on which thumbnail images 31 of the marked frames are displayed.

FIG. 19A illustrates the relationship between two videos A and B recorded in the photo/video mode and marking. In addition, when Marks #1 to #3 belong to video A, and Marks #4 and #5 belong to video B as illustrated in FIG. 19A, separator 50 is displayed at the boundary of thumbnail images 31 at which the videos are switched (FIG. 19B), as previously described with reference to FIG. 9B.

2.5 Bracket Capturing

Digital camera 100 can perform various types of bracket capturing in the photo/video mode. The bracket capturing is a method for creating a plurality of images (frames) by changing an exposure value, a shutter speed, a focus point, a color tone, and the like. The present exemplary embodiment describes a case where exposure values are changed between frames as an example of the bracket capturing. Note that, the values other than the value of the setting which is changed in the bracket capturing are set to those (see FIG. 4) originally set in the photo/video mode.

As illustrated in FIG. 20, digital camera 100 divides the frames acquired in the photo/video mode into groups of three frames. The group of three frames is referred to as GOP (Group Of Picture). The image data (frame) at the head of the GOP is referred to as an I image.

Digital camera 100 performs predetermined bracket capturing in the GOP. Specifically, digital camera 100 performs capturing such that the exposure value of the second frame is set to α+1, and the exposure value of the third frame is set to α−1 based on exposure value α of I image which is the first frame of the GOP. When this process is sequentially performed, image data can be captured at short intervals with capturing setting being changed, whereby a still image of an object having desired capturing setting can be cut out later.

Note that, although the digital camera performs the bracket capturing in the GOP during capturing, it is preferable that only I image is reproduced during the reproduction operation. When video data acquired by the bracket capturing is reproduced without any modifications, the video data is reproduced at short cycles with the capturing setting (e.g., exposure value) being changed. Therefore, the user is likely to have a feeling of strangeness. Accordingly, digital camera 100 reproduces only I image of which capturing setting is unchanged when the video data acquired by the bracket capturing is reproduced, and the images other than I image are displayed when the video data is reproduced frame by frame.

In the above example, the exposure value is changed in the bracket capturing. However, other capturing settings may be changed. For example, image data may be captured with a shutter speed, a focus point, a color tone, or the like being changed. Further, the above example describes a case where only one capturing setting condition (for example, exposure value) is changed in the bracket capturing. However, bracket capturing in which multiple capturing setting conditions are changed may be performed. In addition, the above example describes a case where a GOP is a group of three frames. However, a GOP may be a group of any number of frames, as long as GOP includes multiple images.

2.6 Vertical Capture

Figure 21B:
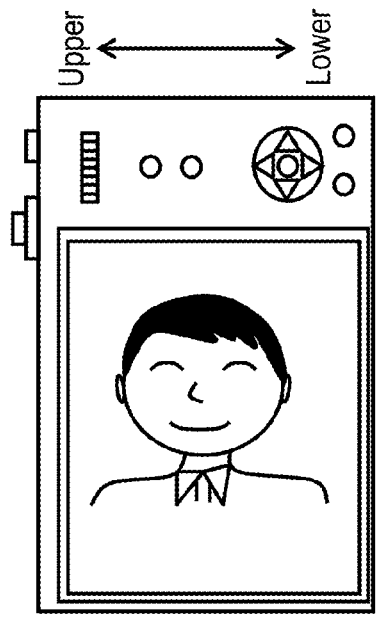
FIG. 21B is a diagram for describing a reproduction screen of a video recorded by vertical capture.
Figure 21C:
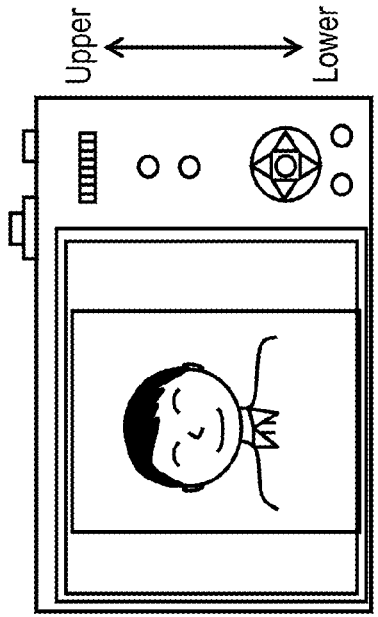
FIG. 21C is a diagram for describing a reproduction screen of a video recorded by vertical capture.
Figure 21A:
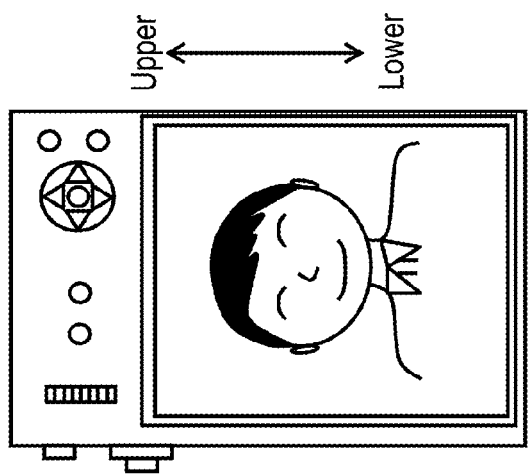
FIG. 21A is a diagram for describing a recording screen of a video recorded by vertical capture.

The photo/video mode is a mode for capturing a video from which a still image is to be cut out, and vertical capture is often performed during capturing a still image. Therefore, in the case where a user holds a camera vertically in the photo/video mode, a video is desirably reproduced vertically. FIGS. 21A to 21C illustrate the case where vertical reproduction is performed and the case where vertical reproduction is not performed, when a video is vertically captured. When a video vertically captured as illustrated in FIG. 21A is reproduced on the camera as it is, an object which is rotated 90 degrees is reproduced on the camera normally held during reproduction as illustrated in FIG. 21B. Therefore, the user has to rotate the camera to more instinctively view the video, which is troublesome. Thus, when the video is reproduced, the video is reproduced in such a manner that the vertical direction of the object is the same as illustrated in FIG. 21C, regardless of the capturing direction of the camera during recording.

Figure 22:
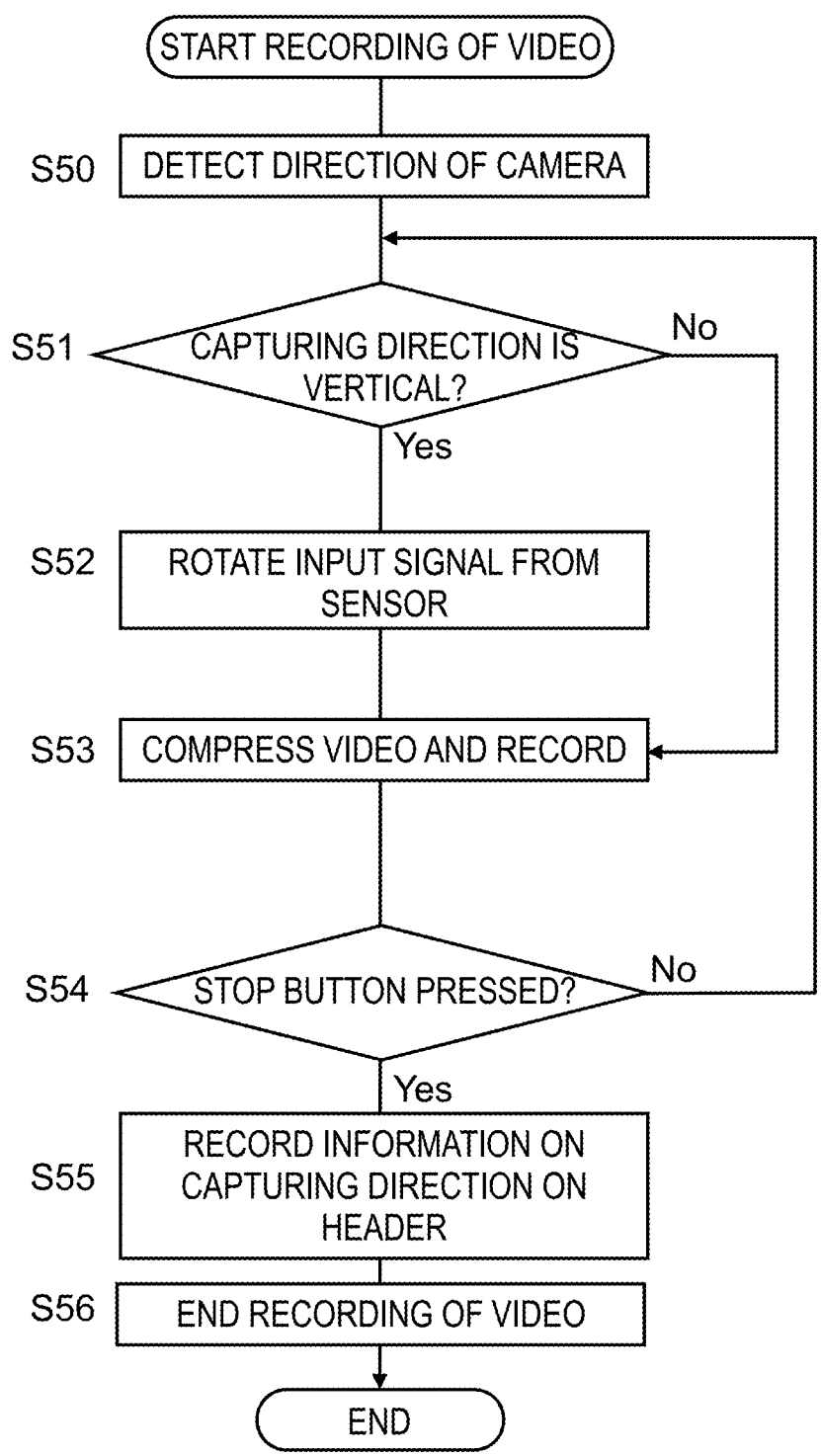
FIG. 22 is a flowchart illustrating one example of a process of the digital camera for vertical capture in the photo/video mode.

FIG. 22 illustrates a flowchart for vertically capturing a video. Digital camera 100 detects a capturing direction (direction of the camera) of the camera at the start of recording a video (step S50). In the case where the capturing direction of the camera is horizontal which is normal (horizontal capture) (No in step S51), digital camera 100 captures the video in the photo/video mode as normal. When the capturing direction is vertical (vertical capture) (Yes in step S51), digital camera 100 rotates a video image signal input from the sensor (CCD 140) 90 degrees (step S52), compresses the rotated video image, and records the resultant (step S53). Thus, digital camera 100 can record the video which is vertically captured.

Higher processing performance is required to record a video than to capture a still image. Therefore, when a video image signal input from CCD 140 is rotated for each frame during recording, it is likely that the processing performance cannot catch up this process. Therefore, as illustrated in flowcharts in FIGS. 23 and 24, digital camera 100 may perform the process in which only rotation information (capturing direction information) is recorded on the header of the video during recording, only the display is rotated during reproduction, and the capturing direction of a still image is additionally rotated when the still image is cut out. This process reduces a processing load, whereby even a digital camera including more inexpensive LSI can vertically capture a video.

Figure 23:
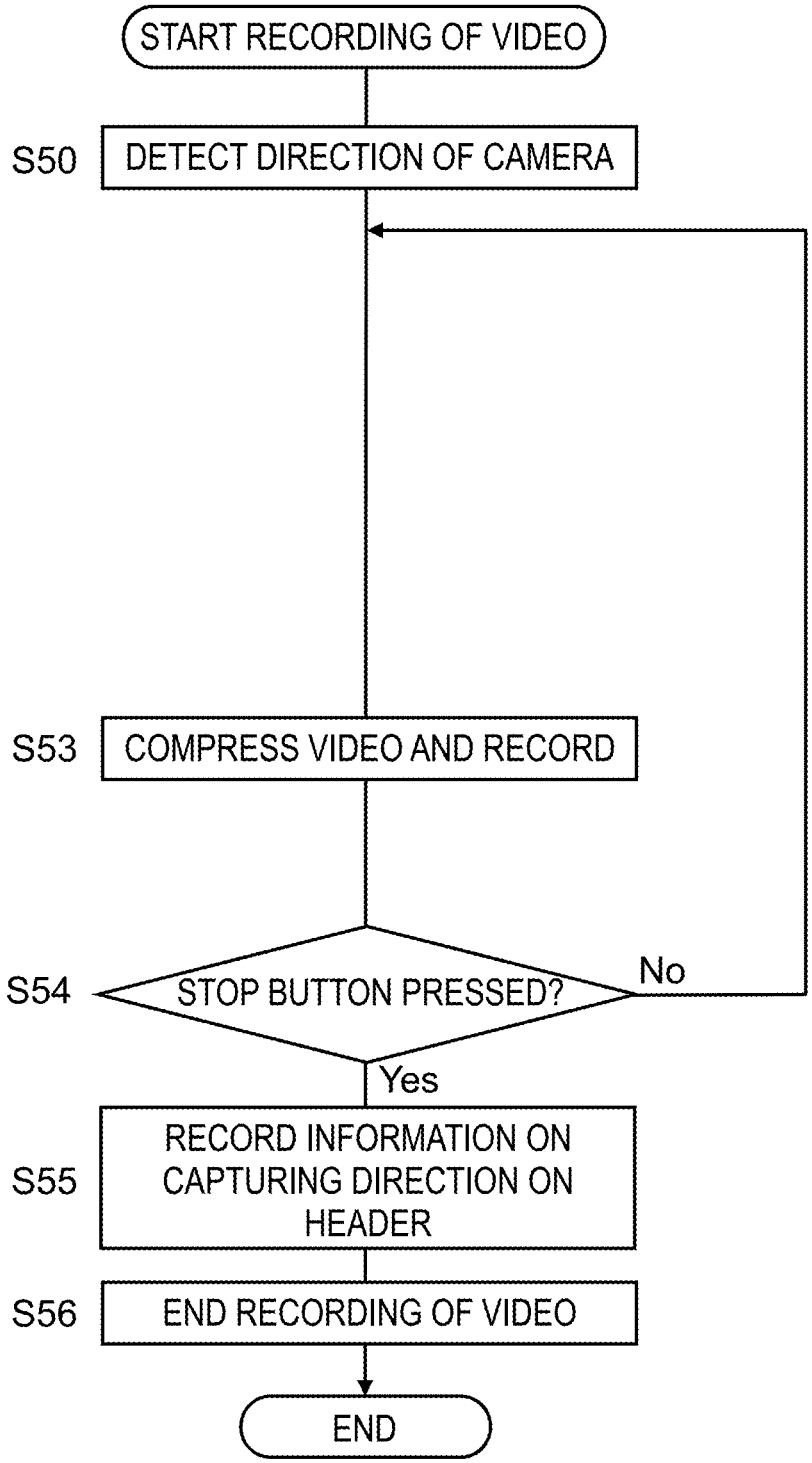
FIG. 23 is a flowchart illustrating another example of a process of the digital camera for vertical capture in the photo/video mode.

FIG. 23 is a flowchart during recording of a video. A video image signal from CCD 140 is not rotated, and rotation information (information of the capturing direction) is only recorded on the header (step S55).

Figure 24:
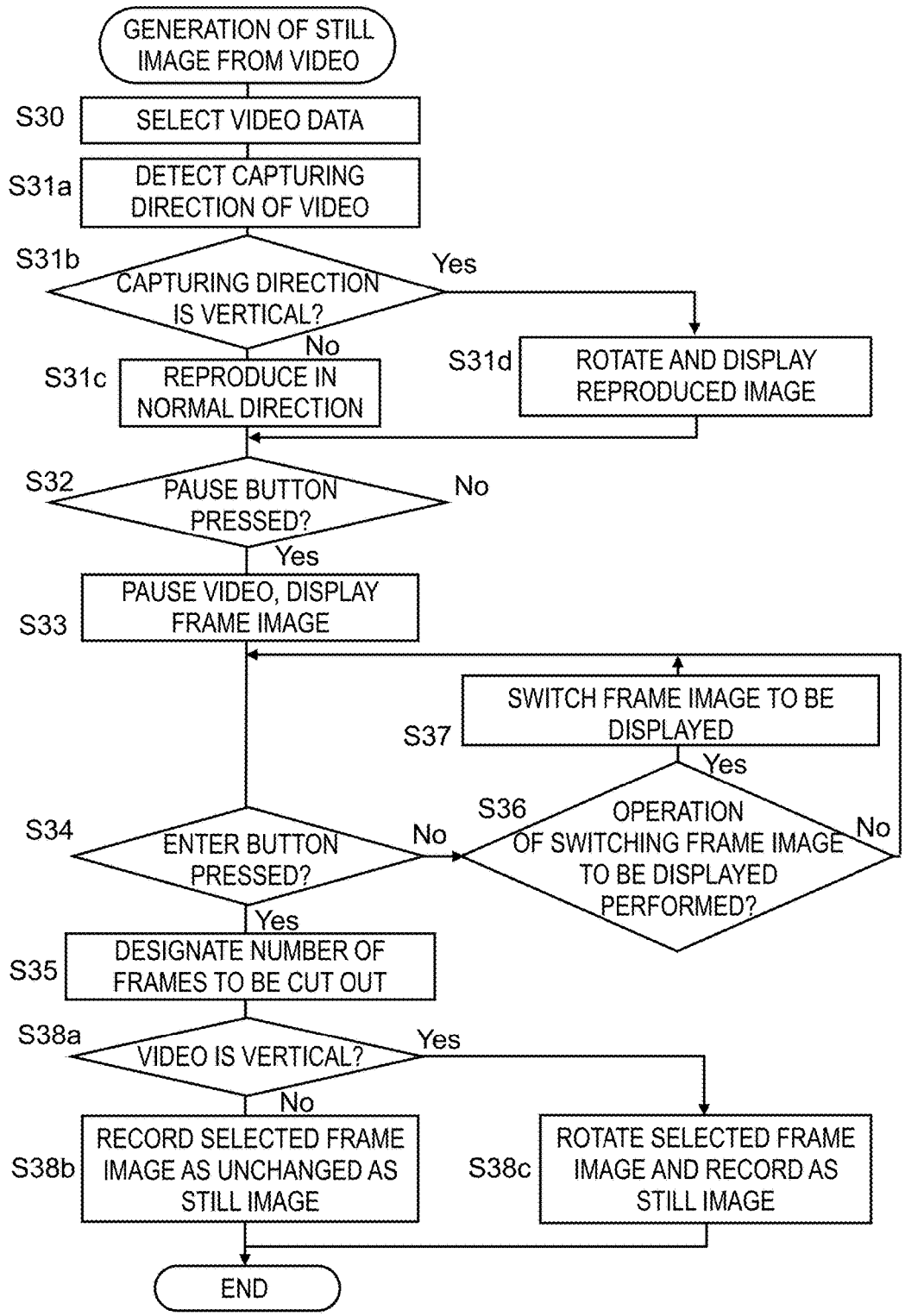
FIG. 24 is a flowchart for describing a process of cutting out a still image from a video recorded by vertical capture.

In addition, FIG. 24 illustrates a flowchart during reproduction. During reproduction, the recorded rotation information is read, and in which direction of the camera (capturing direction) the image is captured is detected (step S31a). When the image is recorded horizontally (transversely) (No in step S31b), digital camera 100 performs reproduction as per normal. When the image is recorded vertically (longitudinally) (Yes in step S31b), digital camera 100 rotates the recorded image 90 degrees, and displays the resultant image as if the video is recorded vertically.

When a still image is to be cut out, the rotation information (information of the capturing direction) of the video is similarly detected from the header (step S38a). If the direction of the video is horizontal, the corresponding frame is cut out as unchanged as a still image (step S38b), and if the direction is vertical, the selected frame image is rotated 90 degrees (step S38c). In this case, the still image is generated with the rotation information indicating that the image is vertically captured being also applied to the header of the still image. The other operations are similar to those in FIG. 8, and descriptions thereof will be omitted. Note that, in step S38c, the frame image may only be rotated without the application of the rotation information to the header, or only the rotation information may be applied to the header without the rotation of the still image. It is only necessary that, when the user reproduces the image, the still image is displayed in the direction corresponding to the capturing direction of the camera during recording of the image.

Note that, the direction of a video may be detected once at the start of recording the video, or may be continuously detected during recording of the video, and rotation information may be applied to the header of the video in time series. Alternatively, the direction of a video may be detected such that captured video data is recorded while being rotated as necessary, and during reproduction, the video is displayed while being rotated as necessary. With this, even if the camera is rotated during recording of the video, a still image in consideration of rotation information can be recorded. FIG. 25 illustrates rotation information recorded in header 601 of the video. Further, information other than the rotation information out of the information which is variable in the video and is recorded on Exif (Exchangeable Image File Format) of the still image is desirably recorded on header 601. One example of the information recorded on header 601 is zoom information. Zooming is frequently used to perform framing of an object while a video is recorded. When zoom information is properly recorded on a still image cut out from a video, a user can sort the picture using focal length information, in the case where this picture is uploaded on a photo sharing website, for example. Thus, usability of the user is enhanced.

3. Effects and the Like

Digital camera 100 according to the present exemplary embodiment includes: an optical system unit (optical system 110, shutter 130, diaphragm 300) that controls optical information indicating an object image; an imaging unit (CCD 140) that generates image data from the optical information input through the optical system unit; image processor 160 that performs a predetermined process to the image data generated by the imaging unit; and a controller (controller 180) that controls at least one of the optical system unit, the imaging unit, and the image processor based on a set value relating to video capturing so as to generate video data. The controller sets a set value relating to video capturing in each of a normal video mode (one example of a first video mode) for recording a video and a photo/video mode (one example of a second video mode) for recording a video with a capturing setting more suitable for recording a still image than in the normal video mode, and automatically sets the set value relating to the video capturing in the photo/video mode to a set value suitable for recording a still image.

As described above, digital camera 100 according to the present exemplary embodiment has the photo/video mode that enables a cutout of a high-quality still image, in addition to the normal video mode. A user can capture a video in the photo/video mode, and then, extract a preferable still image from the captured video. Therefore, the user can generate an image captured at the decisive moment, which has been difficult in the related art, without being conscious of a photo opportunity. For example, the user can easily take a picture of happenings/incidents that can occur any time or take a picture of an instantaneous state of an object (liquid, flame, etc.) which changes its state with time. In the photo/video mode, the set value relating to capturing is automatically (compulsorily) set to a specific set value by which a high-quality still image can be obtained. Therefore, an image having image quality appropriate for a still image can be obtained.

Other Exemplary Embodiments

The first exemplary embodiment has been described above as an illustrative example of the technique disclosed in the present application. However, the technique in the present disclosure is not limited thereto, and is applicable to embodiments in which various changes, substitutions, additions, omissions, and the like are made. In addition, a new exemplary embodiment can be made by combining the components described in the first exemplary embodiment. The other exemplary embodiments will be described below.

(1) In the above exemplary embodiment, specific examples of set values suitable for recording a still image are illustrated in FIG. 4. However, the set values suitable for recording a still image are not limited to the settings illustrated in FIG. 4. The set values suitable for recording a still image may include items other than the set items illustrated in FIG. 4. Further, the set values do not necessarily include all of the set items illustrated in FIG. 4, and may include only some of the items.

(2) In the above exemplary embodiment, when a predetermined button is pressed while a video is recorded in the photo/video mode, a frame that is recorded at that time is marked. The timing at which the marking operation can be executed is not limited thereto. When a predetermined button is pressed for the marking operation while a video recorded in the photo/video mode is reproduced, a frame that is reproduced at that time may be marked.

(3) The above exemplary embodiment describes a digital camera as one example of an imaging device. However, the imaging device is not limited thereto. The idea of the present disclosure is applicable to various types of imaging devices that can capture a video, such as a digital video camera, a smartphone, and a wearable camera.

(4) In the above exemplary embodiment, the imaging element is configured by a CCD. However, the imaging element is not limited thereto. The imaging element may be configured by an NMOS image sensor or a CMOS image sensor.

(5) The photo/video mode described in the above exemplary embodiment is applicable to both an interchangeable lens camera and a lens-integrated camera.

(6) An icon or the like for allowing a video recorded in the photo/video mode described in the above exemplary embodiment to be distinguished from a video captured in the normal video mode may be displayed on the video recorded in the photo/video mode.

(7) In the photo/video mode described in the above exemplary embodiment, the operation system such as the marking button is separately provided. However, the operation system may be assigned to an operation system, such as a function button, to which a desired function can be assigned by a user.

The exemplary embodiments have been described above as illustrative examples of the technique in the present disclosure. For this purpose, the accompanying drawings and the detailed description have been provided. Therefore, the constituent elements described in the accompanying drawings and the detailed description may include not only constituent elements essential for solving the problems but also constituent elements non-essential for solving the problems, in order to illustrate the technique described above. Thus, these non-essential constituent elements should not be readily recognized as being essential, due to these non-essential constituent elements being described in the accompanying drawings and the detailed description. Furthermore, since the exemplary embodiments described above are intended to illustrate the technique in the present disclosure, various changes, substitutions, additions, omissions, and the like can be made within the scope of the claims and the scope of equivalents thereof.

INDUSTRIAL APPLICABILITY

The present disclosure is applicable to an imaging device that can capture a video. Specifically, the present disclosure is applicable to various types of imaging devices that can capture a video, such as a digital video camera, a smartphone, or a wearable camera.

REFERENCE MARKS IN THE DRAWINGS 31 thumbnail image
41, 42, 43 button
50 separator
55a, 55b frame feed button
100 digital camera
110 optical system
120 lens driver
130 shutter
140 CCD
150 ADC
160 image processor
170 buffer
180 controller
190 card slot
200 memory card
210 operation member
211 release button
213 selection button
214 enter button
217 video recording button
218 exclusive button
219 marking button
220 display monitor
240 internal memory
300 diaphragm
400 icon
501, 502 cursor
503 marking display
601 header
602, 603 point

What is claimed is:
1. An imaging device comprising:
an optical system unit that controls optical information indicating an object image, the optical system unit including at least one lens;
an imaging unit that captures image data from the optical information input through the optical system unit;
an image processor that performs a predetermined process to the image data generated by the imaging unit; and
a controller that controls at least one of the optical system unit, the imaging unit, and the image processor based on video capture settings relating to video capturing so as to generate video data,
wherein the controller has at least a first video mode and a second video mode, each of which is configured to generate the video data, whereby:
in the first video mode, video is captured in accordance with at least one or more first video capture settings;
in the second video mode, video is captured in accordance with at least one or more second video capture settings; and
the at least one or more second video capture settings being more suitable for recording a still image than the at least one or more first video capture settings,
wherein the controller in the second video mode automatically sets the video capture settings to the at least one or more second video capture settings so that image quality of a still image generated from a single frame of a captured video taken during video capture in the second video mode is greater than image quality of a still image generated from a single frame of a captured video taken during video capture in the first video mode,
wherein the video in the second video mode is captured in accordance with the at least one or more second video capture settings from start to end of a video recording and includes one or more frames generated into the still image,
wherein each of the at least one or more first video capture settings and the at least one or more second video capture settings includes a setting relating to at least one of an autofocus tracking speed, an autoexposure tracking speed, and a white balance tracking speed, and
wherein the greater image quality is due to at least one of the autofocus tracking speed, the autoexposure tracking speed, and the white balance tracking speed being set to a higher value in the at least one or more second video capture settings than in the at least one or more first video capture settings.

2. The imaging device according to claim 1, further comprising a display unit,
wherein, when a video mode is set to the second video mode, the controller displays a display indicating that the video mode is set to the second video mode on the display unit.

3. The imaging device according to claim 1, further comprising a display unit,
wherein the display unit displays an operation screen for generating a still image from a video captured in the second video mode, the operation screen including a thumbnail image corresponding to a frame at a predetermined time interval, the frame constituting the video data recorded in the second video mode.

4. The imaging device according to claim 1, wherein the controller generates a still image by cutting out one frame image from a plurality of frame images constituting the video data recorded in the second video mode.

5. The imaging device according to claim 1, further comprising an operation member,
wherein the controller
starts the video recording in the second video mode when the operation member for the video recording is operated in a state in which the second video mode is set,
stops the video recording in the second video mode when the operation member for the video recording is operated during the video recording.

6. The imaging device according to claim 1, further comprising:
a setting unit that sets a mode for the video recording to the second video mode.

7. The imaging device according to claim 1, further comprising an operation system that sets a video mode to the second video mode with a single operation,
wherein, when the second video mode is set with the operation system, the controller automatically sets the video capture settings to the at least one or more second video capture settings.

8. The imaging device according to claim 1, wherein the at least one or more second video capture settings includes a plurality of values.

9. The imaging device according to claim 8, wherein:
each of the at least one or more first video capture settings and the at least one or more second video capture settings includes a shutter speed, and
the shutter speed is set to higher value in the at least one or more second video capture settings than in the at least one or more first video capture settings when a shutter speed priority mode is set and regardless of a reduction in image quality of the captured video in the second video mode.

10. The imaging device according to claim 8, wherein the video capture settings include a brightness level setting, a range of the brightness level setting being set to a maximum settable range in the settings relating to the video capturing in the second video mode.

11. The imaging device according to claim 8, wherein:
when the second video mode is set, the controller automatically sets the video capture settings to the at least one or more second video capture settings,
each of the at least one or more first video capture settings and the at least one or more second video capture settings includes a value of a frame rate and a value of a resolution,
the value of the frame rate in the first video mode is set to be equal to or lower than the value of the frame rate in the second video mode, and
the at least one or more second video capture settings includes one of the following combinations (i), (ii), and (iii):
(i) the highest value of the resolution in the video capture settings and the value of the frame rate which is not the highest but higher than a predetermined value,
(ii) the highest value of the frame rate in the video capture settings and the value of the resolution which is not the highest but higher than a predetermined value, and
(iii) the highest value of the resolution in the video capture settings and the highest value of the frame rate in the video capture settings.

12. The imaging device according to claim 8, wherein:
when the second video mode is set, the controller automatically sets the video capture settings to the at least one or more second video capture settings,
each of the at least one or more first video capture settings and the at least one or more second video capture settings includes a value of frame rate, and the value of the frame rate in the second video mode is the highest value in the video capture settings.

13. The imaging device according to claim 8, wherein:
the video capture settings includes a shutter speed and frame rate,
the shutter speed is set to be less than a frame period of a video in the at least one or more second video capture settings.

14. The imaging device according to claim 8, wherein the video capture settings includes an exposure setting, the exposure setting being set to a shutter speed priority mode in the at least one or more second video capture settings.

15. The imaging device according to claim 14, wherein a shutter speed is set to be less than a frame period of a video in the at least one or more second video capture settings.

16. The imaging device according to claim 14, wherein the video capture settings further include a setting of an upper limit of ISO sensitivity, and
the upper limit value of the ISO sensitivity is set to be higher than a value set in the first video mode in the setting relating to the video capturing in the second video mode.

* * * * *